US012596456B2

(12) United States Patent
Lee et al.

(10) Patent No.: US 12,596,456 B2
(45) Date of Patent: Apr. 7, 2026

(54) TOUCH DISPLAY DEVICE AND DISPLAY PANEL

(71) Applicant: LG DISPLAY CO., LTD., Seoul (KR)

(72) Inventors: Jae Ho Lee, Paju-si (KR); Ji Su Yoon, Paju-si (KR); Dong Ryul Jung, Paju-si (KR); Ji Seok Yang, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/787,711

(22) Filed: Jul. 29, 2024

(65) Prior Publication Data

US 2025/0044901 A1    Feb. 6, 2025

(30) Foreign Application Priority Data

Aug. 2, 2023    (KR) ........................ 10-2023-0101198

(51) Int. Cl.
*G06F 3/042* (2006.01)
*G06F 3/041* (2006.01)

(52) U.S. Cl.
CPC .......... *G06F 3/0421* (2013.01); *G06F 3/0412* (2013.01)

(58) Field of Classification Search
CPC .. G06F 3/0421; G06F 3/0412; G06F 3/04162; G06F 3/0418; G06F 3/041; G02B 5/20
See application file for complete search history.

(56) References Cited

U.S. PATENT DOCUMENTS

| | | | | |
|---|---|---|---|---|
| 4,806,221 | A * | 2/1989 | Gillery ................ C03C 17/3642 |
| | | | | 204/192.27 |
| 2006/0226244 | A1 * | 10/2006 | Boitsov ........... G06K 19/06037 |
| | | | | 235/494 |
| 2008/0233291 | A1 * | 9/2008 | Chandrasekaran .... B41M 5/265 |
| | | | | 427/299 |
| 2013/0321357 | A1 * | 12/2013 | Yamada ................ G06F 3/0386 |
| | | | | 345/179 |
| 2015/0130726 | A1 * | 5/2015 | Min ...................... G06F 3/0443 |
| | | | | 345/173 |
| 2015/0255505 | A1 * | 9/2015 | Jeoung ............... H10H 20/8514 |
| | | | | 257/89 |
| 2021/0249619 | A1 * | 8/2021 | Seo ......................... H10K 50/16 |
| 2022/0298362 | A1 * | 9/2022 | Zalich .................... C09K 11/02 |
| 2023/0064478 | A1 * | 3/2023 | Liu ................... G02F 1/133638 |

FOREIGN PATENT DOCUMENTS

KR        20130028284 A * 3/2013    .............. G02B 5/30

OTHER PUBLICATIONS

Machine Translation of KR 20130028284 (Year: 2013).*

* cited by examiner

*Primary Examiner* — Patrick N. Edouard
*Assistant Examiner* — Joseph P Fox
(74) *Attorney, Agent, or Firm* — Birch, Stewart, Kolasch & Birch, LLP

(57) ABSTRACT

A touch display panel having a plurality of light emitting elements; a plurality of color filters formed at positions corresponding to the plurality of light emitting elements; and an infrared fluorescent pattern comprising a plurality of individual infrared fluorescent cell patterns formed at positions corresponding to at least some of the plurality of color filters; and an infrared control film positioned on a light emitting surface of the display panel.

17 Claims, 16 Drawing Sheets

200

TOUCH DISPLAY DEVICE AND DISPLAY PANEL

CROSS-REFERENCE TO RELATED APPLICATION

This application claims priority to Korean Patent Application No. 10-2023-0101198, filed in the Republic of Korea on Aug. 2, 2023, the entire contents of which are hereby incorporated by reference into the present application.

BACKGROUND

Field

Embodiments of the disclosure relate to a touch display device and a display panel and, more specifically, to a touch display device and a display panel having improved touch performance by enhancing dependency on an inclination angle of a stylus.

Description of Related Art

The growth of the intelligent society leads to increased demand for various types of display devices such as liquid crystal displays, electroluminescent displays, or quantum dot light emitting displays, are being used. In addition, the display device recognizes the user's finger touch or a pen touch on the display panel and performs input processing based on the recognized touch to provide more various functions. As an example, a display device capable of touch recognition includes touch electrodes arranged or embedded in a display panel and can detect the presence of the user's touch on the display panel and coordinates of a touch by driving the touch electrodes.

Such touch display devices are also adopted in large-scale touch display devices, such as vehicle displays and showcase displays, as well as mobile devices, such as smartphone or tablet PCs. Further, the touch function for the touch display device can use not only include a passive stylus, such as a finger, but also an active stylus capable of transmitting and receiving signals to and from the display panel.

SUMMARY

Accordingly, one object of the present disclosure is to provide a touch display device and display panel having an improved touch performance by enhancing dependency on the inclination angle of an infrared stylus.

Another object of the present disclosure is to provide a touch display device and a display panel efficiently detecting reflected infrared light using an infrared fluorescent pattern and an infrared control film.

Still another object of the present disclosure is to provide a touch display device and a display panel capable of process optimization by forming an infrared fluorescent pattern to correspond to a color filter.

Still another object of the present disclosure is to provide a touch display device and a display panel capable of detect reflected infrared light by effectively canceling out the infrared light reflected inside, using an infrared control film.

To achieve these and other advantages and in accordance with the purpose of the present invention, as embodied and broadly described herein, the present disclosure provides in one aspect a touch display device including a display panel including a plurality of light emitting elements, a plurality of transistors, a plurality of color filters formed at positions corresponding to the plurality of light emitting elements, and an infrared fluorescent pattern formed at a position overlapping at least some of the plurality of color filters and an infrared control film positioned on a light emitting surface of the display panel.

In another aspect, the present disclosure provides a display panel comprising a plurality of light emitting elements having an anode electrode or a cathode electrode used as an infrared reflective electrode, a plurality of transistors having a gate electrode, a drain electrode, and a source electrode, at least one of which is used as an infrared reflective electrode, a plurality of color filters formed at positions corresponding to the plurality of light emitting elements; an infrared fluorescent pattern formed at a position overlapping at least some of the plurality of color filters, and an infrared control film positioned on a light emitting surface.

In still another aspect, the present disclosure provides a touch display device having a display panel including a plurality of light emitting elements, a plurality of transistors, and a plurality of color filters formed at positions corresponding to the plurality of light emitting elements and an infrared control film positioned on a light emitting surface of the display panel, wherein some of the plurality of color filters include an infrared fluorescent pigment.

Thus, according to embodiments of the disclosure, it is possible to improve touch performance by enhancing dependency on the inclination angle of an infrared stylus. It is also possible to efficiently (easily) detect reflected infrared light using an infrared fluorescent pattern and an infrared control film. Further, it is also possible to achieve process optimization by forming an infrared fluorescent pattern to correspond to a color filter and to detect reflected infrared light by canceling out the infrared light reflected inside, using an infrared control film.

BRIEF DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
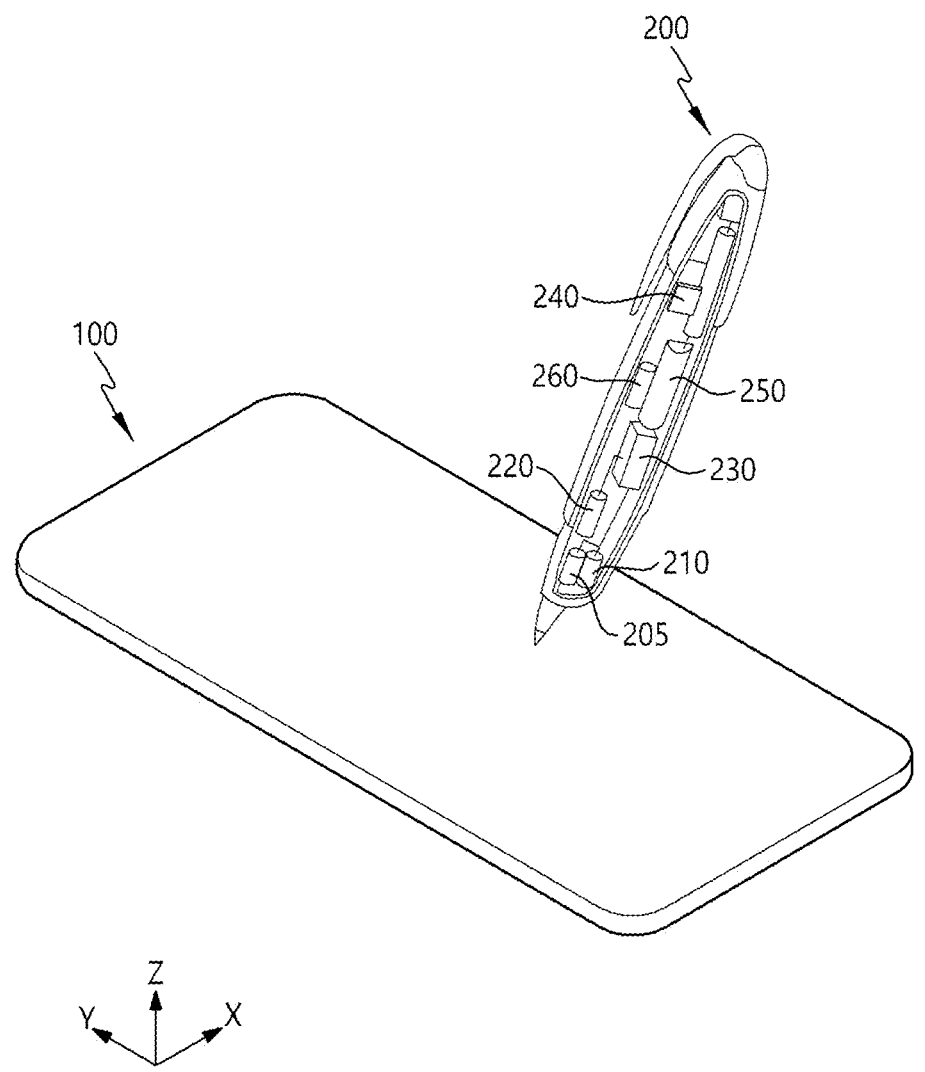
FIG. 1 is a perspective view illustrating a touch sensing system according to embodiments of the disclosure.

Hereinafter, some embodiments of the disclosure will be described in detail with reference to exemplary drawings. In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" can be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element can be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms can be used to describe non-consecutive or non-sequential processes or operations unless the term "directly" or "immediately" is used together. In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term "can" fully encompasses all the meanings of the term "can".

Hereinafter, various embodiments of the disclosure will be described in detail with reference to the accompanying drawings. In particular, FIG. 1 is a perspective view illustrating a touch sensing system, FIG. 2 is a block diagram illustrating an infrared stylus in a touch sensing system, and FIG. 3 is a block diagram illustrating a touch display device in a touch sensing system according to embodiments of the disclosure.

Figure 2:
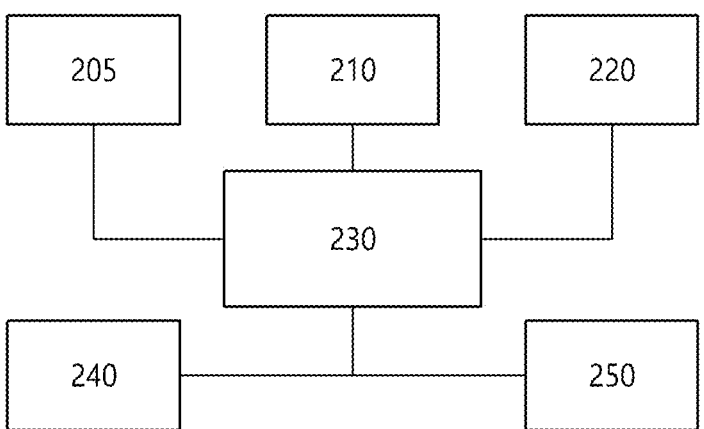
FIG. 2 is a block diagram illustrating an infrared stylus in a touch sensing system according to embodiments of the disclosure.
Figure 3:
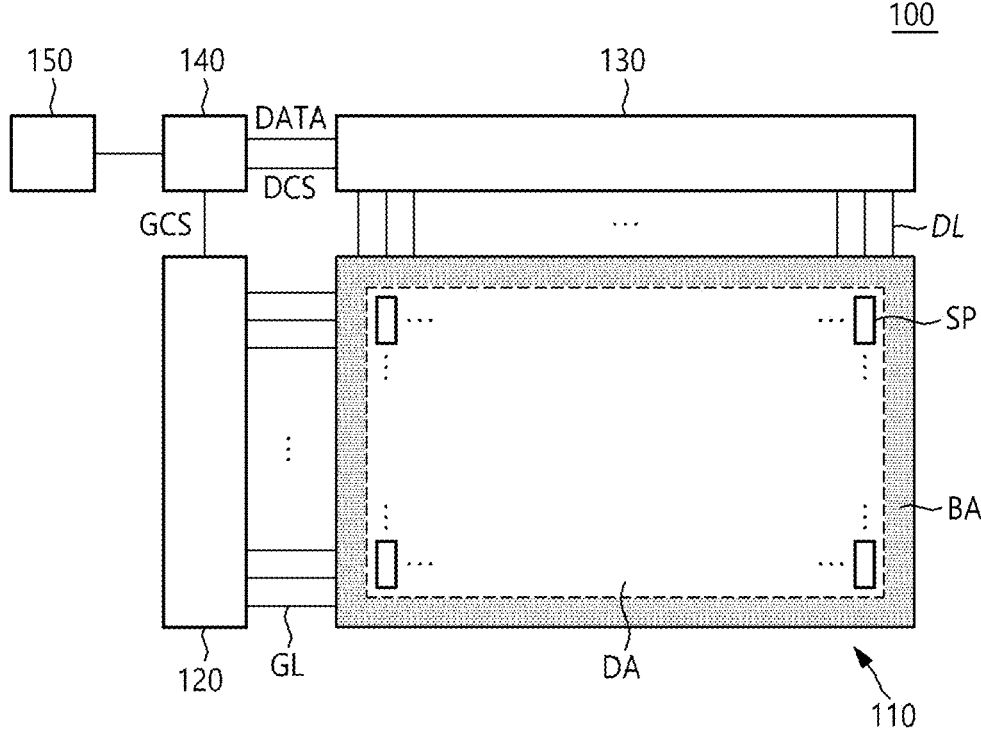
FIG. 3 is a block diagram illustrating a touch display device in a touch sensing system according to embodiments of the disclosure.

Referring to FIGS. 1 to 3, a touch sensing system according to embodiments of the disclosure can include a touch display device 100 and an infrared stylus 200. The infrared stylus 200 can include an infrared light emitting element 205, an infrared sensor 210, a piezoelectric sensor 220, a processor 230, a communication module 240, a memory 250, and a battery 260.

In addition, the infrared stylus 200 can be a smart pen or active pen capable of generating coordinate data using an optical method. Also, as shown in FIG. 1, the infrared light emitting element 205 is disposed in front of the infrared stylus 200 and can emit infrared light in the direction of the touch display device 100. The infrared light emitting element 205 can also be formed of an infrared light emitting diode.

Further, the infrared sensor 210 can be disposed in front of the infrared stylus 200and detect reflected infrared light transferred from the touch display device 100 through an infrared fluorescent pattern and an infrared control film formed in the touch display device 100. In particular, the infrared sensor 210 can continuously photograph or capture reflected infrared light at a corresponding position according to the movement of the infrared stylus 200, and provide an infrared pattern information detected through the reflected infrared light to the processor 230.

In addition, the piezoelectric sensor 220 can sense the pressure applied by the infrared stylus 200 to the touch display device 100 and provide pressure information about the infrared stylus 200 to the processor 230. The processor 230 can receive at least one piece of infrared pattern information from the infrared sensor 210 and convert the infrared pattern information into a data code and generate coordinate data using the data code.

In this instance, the processor 230 can quickly and efficiently generate coordinate data without complex computations or corrections by converting the infrared pattern information into a one-to-one corresponding data code. Therefore, the touch sensing system of the disclosure can reduce power consumption and simplify driving operations. The processor 230 can also transmit the generated coordinate data to the touch display device 100 through the communication module 240.

The communication module 240 can perform wired or wireless communication with an external device. For example, the communication module 240 can transmit and receive wired or wireless signals with the communication circuit of the touch display device 100.

In addition, the memory 250 can store data used for the driving operation of the infrared stylus 200. Since the infrared stylus 200 can convert the infrared pattern information into corresponding data code and directly provide the coordinate data generated therefrom to the touch display device 100, the infrared stylus 200 can include the memory 250 having a capacity corresponding to one piece of infrared pattern information.

Further, as shown in FIG. 3, the touch display device 100 can include a display panel 110 and a driving circuit for driving the display panel 110. In addition, the display panel 110 can include a display area DA in which images are displayed and a bezel area BA in which no image is displayed. The bezel area BA can also be referred to as a non-display area.

As shown in FIG. 3, the display panel 110 can include subpixels SP for displaying images. For example, subpixels SP can be disposed in the display area DA. In some instances, at least one subpixel SP can be disposed in the bezel area BA and is referred to as a dummy subpixel.

In addition, as shown, the display panel 110 can include signal lines for driving subpixels SP. For example, the signal lines can include data lines DL and gate lines GL. Other signal lines can also be provided according to the structure of the subpixel SP. For example, the other signal lines can include driving voltage lines and reference voltage lines.

As shown in FIG. 3, the data lines DL and the gate lines GL can cross each other. In more detail, the data lines DL can be disposed while extending in a first direction and the gate lines GL can be disposed while extending in a second direction. Here, the first direction can be a column direction and the second direction can be a row direction. In the disclosure, the column direction and the row direction are relative. For example, the column direction can be a vertical direction and the row direction can be a horizontal direction. As another example, the column direction can be a horizontal direction and the row direction can be a vertical direction.

As shown in FIG. 3, the driving circuit can include a data driving circuit 130 for driving the data lines DL and a gate driving circuit 120 for driving the gate lines GL. The driving circuit can further include a timing controller 140 for controlling the data driving circuit 130 and the gate driving circuit 120.

In more detail, the data driving circuit 130 is for driving the data lines DL, and can output data signals (also referred to as data voltages) corresponding to image signals to the data lines DL. Also, the gate driving circuit 120 is for driving the gate lines GL and can generate gate signals, and output the gate signals to the gate lines GL. The gate signal can include one or more scan signals and light emission signals.

Further, the timing controller 140 can start a scan according to the timing implemented in each frame and control data driving at an appropriate time according to the scan. The timing controller 140 can also convert input image data input from the outside to suit the data signal format used by the data driving circuit 130 and supply the converted image data DATA to the data driving circuit 130.

In addition, the timing controller 140 can receive display driving control signals, along with input image data, from an external host system. For example, the display driving control signals can include a vertical synchronizing signal, a horizontal synchronizing signal, an input data enable signal, and a clock signal.

The timing controller 140 can also generate the data driving control signal DCS and the gate driving control signal GCS based on display driving control signals input from the host system. Further, the timing controller 140 can control the driving operation and driving timing of the data driving circuit 130 by supplying the data driving control signal DCS to the data driving circuit 130. The timing controller 140 can also control the driving operation and driving timing of the gate driving circuit 120 by supplying the gate driving control signal GCS to the gate driving circuit 120.

In addition, the data driving circuit 130 can include one or more source driving integrated circuits SDIC. Each source driving integrated circuit can include a shift register, a latch circuit, a digital to analog converter (DAC), an output buffer, and the like. In some instances, each source driving integrated circuit can further include an analog to digital converter (ADC). For example, each source driving integrated circuit can be connected with the display panel 110 by a tape automated bonding (TAB) method or connected to a bonding pad of the display panel 110 by a chip on glass (COG) or chip on panel (COP) method or can be implemented by a chip on film (COF) method and connected with the display panel 110.

Further, the gate driving circuit 120 can output a gate signal of a turn-on level voltage or a gate signal of a turn-off level voltage according to the control of the timing controller 140. The gate driving circuit 120 can also sequentially drive the gate lines GL by sequentially supplying gate signals of the turn-on level voltage to the gate lines GL.

In addition, the gate driving circuit 120 can include one or more gate driving integrated circuits GDIC. Also, the gate driving circuit 120 can be connected with the display panel 110 by a TAB method or connected to a bonding pad of the display panel 110 by a COG or COP method or be connected with the display panel 110 according to a COF method. Alternatively, the gate driving circuit 120 can be formed, in a gate in panel (GIP) type, in the bezel area BA of the display panel 110. The gate driving circuit 120 can also be disposed on the substrate or be connected to the substrate. In other words, the gate driving circuit 120 that is of a GIP type can be disposed in the bezel area BA of the substrate. The gate driving circuit 120 that is of a chip-on-glass (COG) type or chip-on-film (COF) type can also be connected to the substrate.

In addition, at least one of the data driving circuit 130 and the gate driving circuit 120 can be disposed in the display area DA. For example, at least one of the data driving circuit 130 and the gate driving circuit 120 can be disposed not to overlap the subpixels SP or to overlap all or some of the subpixels SP.

Further, the data driving circuit 130 can be connected to one side (e.g., an upper or lower side) of the display panel 110. Depending on the driving scheme or the panel design scheme, the data driving circuit 130 can be connected with both sides (e.g., upper and lower sides) of the self-emission display panel 110, or two or more of the four sides of the self-emission display panel 110.

Also, the gate driving circuit 120 can be connected with one side (e.g., a left or right side) of the display panel 110. Depending on the driving scheme or the panel design scheme, the gate driving circuit 120 can be connected with both sides (e.g., left and right sides) of the display panel 110, or two or more of the four sides of the display panel 110.

In addition, the timing controller 140 can be implemented as a separate component from the data driving circuit 130, or the timing controller 140 and the data driving circuit 130 can be integrated into an integrated circuit (IC). The timing controller 140 can be a controller used in typical display technology or a control device that can perform other control functions as well as the functions of the timing controller, or a circuit in the control device. The timing controller 140 can also be implemented as various circuits or electronic components, such as an integrated circuit (IC), a field programmable gate array (FPGA), an application specific integrated circuit (ASIC), or a processor.

In addition, the timing controller 140 can be mounted on a printed circuit board or a flexible printed circuit and be electrically connected with the data driving circuit 130 and the gate driving circuit 120 through the printed circuit board or the flexible printed circuit. The timing controller 140 can transmit/receive signals to/from the data driving circuit 130 according to one or more predetermined interfaces. In more detail, an interface can include, e.g., a low voltage differential signaling (LVDS) interface, an EPI interface, and a serial peripheral interface (SP).

Further, the touch display device 100 can be a self-emissive display device in which the display panel 110 emits light by itself. When the touch display device 100 is a self-emissive display device, each of the subpixels SP can include a light emitting element. For example, the touch display device 100 can be an organic light emitting diode display in which the light emitting element is implemented as an organic light emitting diode (OLED). As another example, the touch display device 100 can be an inorganic light emitting display device in which the light emitting element is implemented as an inorganic material-based light emitting diode. As another example, the touch display device 100 according to embodiments of the disclosure can be a quantum dot display device in which the light emitting element is implemented as a quantum dot which is self-emission semiconductor crystal.

Further, the timing controller 140 can perform wired/wireless communication with an infrared stylus through a communication circuit 150. In particular, the communication circuit 150 can receive coordinate data from the infrared stylus 200 and provide the coordinate data to the timing controller 140. The timing controller 140 can then generate image data DATA by combining input image data supplied from the host system and the coordinate data supplied from the infrared stylus 200. The data driving circuit 130 can then display the image data DATA including the coordinate data of the infrared stylus 200 through the display panel 110.

Figure 4:
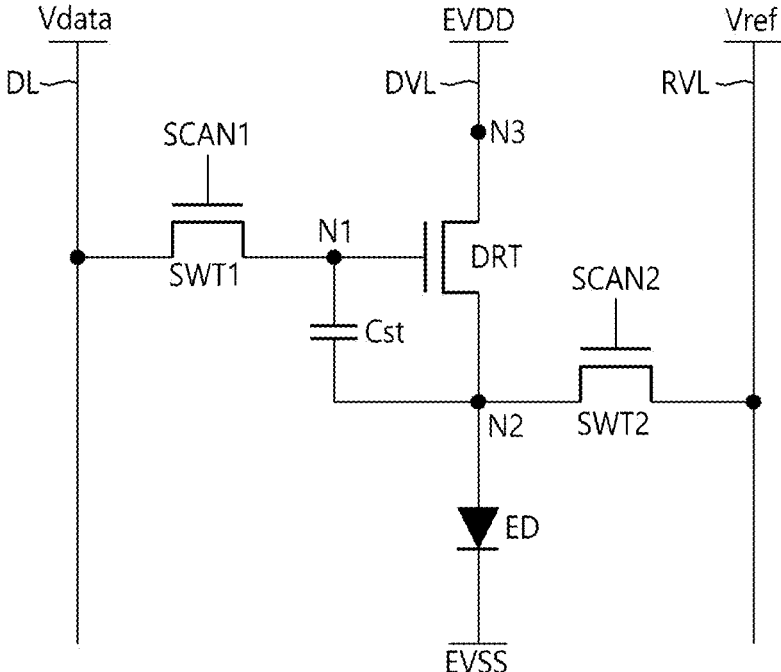
FIG. 4 is a view illustrating an example of a circuit constituting a subpixel in a touch display device according to embodiments of the disclosure.

Next, FIG. 4 is a view illustrating an example of a circuit constituting a subpixel in a touch display device according to embodiments of the disclosure. Referring to FIG. 4, the subpixel SP can include one or more transistors, a capacitor and a light emitting element disposed therein.

For example, as shown in FIG. 4, the subpixel SP can include a driving transistor DRT, a first switching transistor SWT1, a second switching transistor SWT2, a storage capacitor Cst, and a light emitting diode ED. In addition, the driving transistor DRT includes the first node N1, second node N2, and third node N3. The first node N1 of the driving transistor DRT can be a gate node to which the data voltage Vdata is applied from the data driving circuit 130 through the data line DL when the first switching transistor SWT1 is turned on.

Further, the second node N2 of the driving transistor DRT can be electrically connected with the anode electrode of the light emitting diode ED and can be the source node or drain node. The third node N3 of the driving transistor DRT can also be electrically connected with the driving voltage line DVL to which the subpixel driving voltage EVDD is applied and can be the drain node or the source node. In this instance, during a display driving period, a subpixel driving voltage EVDD used for displaying an image can be supplied to the driving voltage line DVL. For example, the subpixel driving voltage EVDD necessary for displaying an image can be 27V.

In addition, as shown in FIG. 4, the first switching transistor SWT1 is electrically connected between the first node N1 of the driving transistor DRT and the data line DL, and the gate line GL is connected to the gate node. Thus, the first switching transistor SWT1 is operated according to the first scan signal SCAN1 supplied through the gate line GL. When turned on, the first switching transistor SWT1 transfers the data voltage Vdata supplied through the data line DL to the gate node of the driving transistor DRT, thereby controlling the operation of the driving transistor DRT.

Also, as shown, the second switching transistor SWT2 is electrically connected between the second node N2 of the driving transistor DRT and the reference voltage line RVL, and the gate line GL is connected to the gate node and is operated according to the second scan signal SCAN2 supplied through the gate line GL. When the second switching transistor SWT2 is turned on, a reference voltage Vref supplied through the reference voltage line RVL is transferred to the second node N2 of the driving transistor DRT.

In other words, as the first switching transistor SWT1 and the second switching transistor SWT2 are controlled, the voltage of the first node N1 and the voltage of the second node N2 of the driving transistor DRT are controlled, so that the current for driving the light emitting diode ED can be supplied.

In addition, the gate nodes of the first switching transistor SWT1 and the second switching transistor SWT2 can be commonly connected to one gate line GL or can be connected to different gate lines GL. FIG. 4 illustrates an example in which the first switching transistor SWT1 and the second switching transistor SWT2 are connected to different gate lines GL and can be independently controlled by the first scan signal SCAN1 and the second scan signal SCAN2 transferred through different gate lines GL. In contrast, if the first switching transistor SWT1 and the second switching transistor SWT2 are connected to one gate line GL, the first switching transistor SWT1 and the second switching transistor SWT2 can be simultaneously controlled by the first scan signal SCAN1 or second scan signal SCAN2 transferred through one gate line GL, and the aperture ratio of the subpixel SP can be increased.

Further, the transistor disposed in the subpixel SP can be an n-type transistor or a p-type transistor and, in the shown example, the transistor is an n-type transistor. Also, as shown, the storage capacitor Cst is electrically connected between the first node N1 and second node N2 of the driving transistor DRT and maintains the data voltage Vdata during one frame.

The storage capacitor Cst can also be connected between the first node N1 and third node N3 of the driving transistor DRT depending on the type of the driving transistor DRT. In addition, the anode electrode of the light emitting diode ED can be electrically connected with the second node N2 of the driving transistor DRT, and a base voltage EVSS can be applied to the cathode electrode of the light emitting diode ED.

Further, the base voltage EVSS can be a ground voltage or a voltage higher or lower than the ground voltage. The base voltage EVSS can also be varied depending on the driving state. For example, the base voltage EVSS at the time of display driving and the base voltage EVSS at the time of sensing driving can be set to differ from each other.

In addition, the first switching transistor SWT1 and the second switching transistor SWT2 can be referred to as scan transistors controlled through scan signals SCAN1 and SCAN2. The structure of the subpixel SP can further include one or more transistors or, in some instances, further include one or more capacitors. Thus, the touch display device 100 can effectively detect reflected infrared light using an infrared fluorescent pattern capable of dispersing infrared light and an infrared control film capable of reducing infrared light reflected inside the display panel 110.

Figure 5:
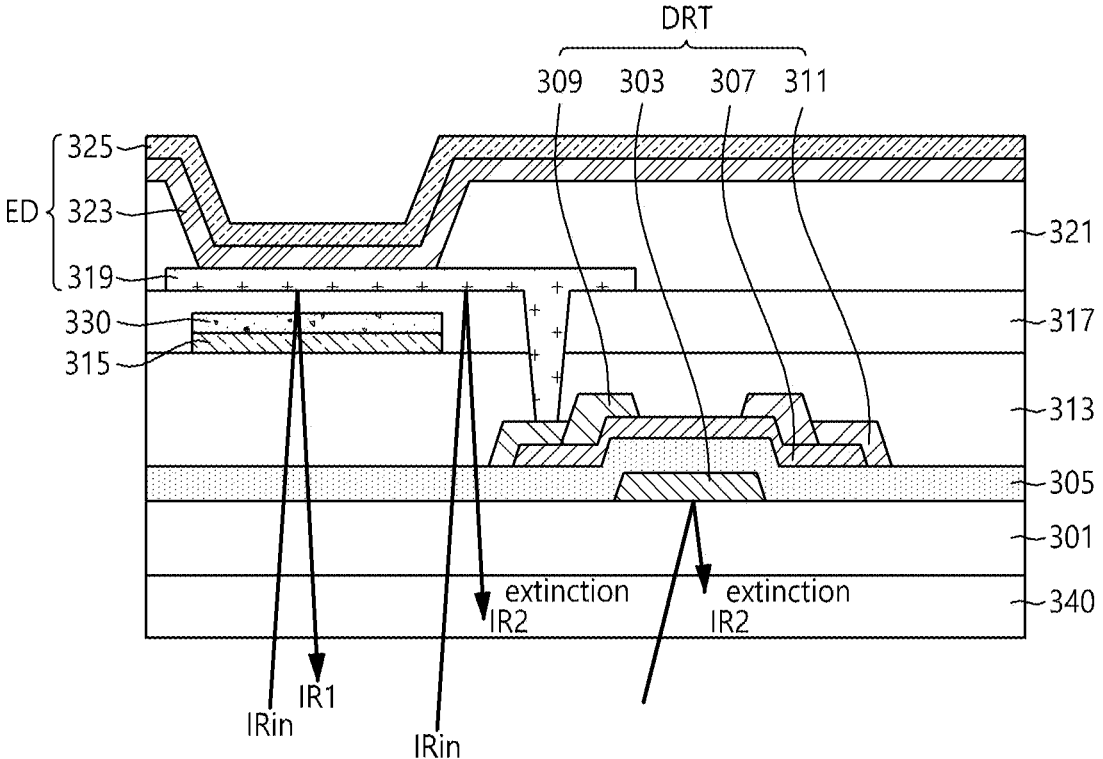
FIG. 5 is a cross-sectional view illustrating a touch display device according to embodiments of the disclosure.

Next, FIG. 5 is a cross-sectional view schematically illustrating a touch display device 100 according to embodiments of the disclosure. Referring to FIG. 5, the touch display device 100 can include a substrate 301, a driving transistor DRT, a color filter 315, a light emitting element ED, an infrared fluorescent pattern 330, and an infrared control film 340.

Here, the driving transistor DRT is illustrated as an example, but the switching transistors SWT1 and SWT2 can have a structure similar to that of the driving transistor DRT depending on the position. The substrate 301 can also have a flexible characteristic (e.g., bendable, unbreakable, rollable, foldable characteristic, or the like).

In addition, the substrate 301 can be formed of a transparent glass material or plastic. When the substrate 301 is formed of plastic, it can be referred to as a plastic film or a plastic substrate. For example, the substrate 301 can include one selected from the group consisting of a polyester-based polymer, a silicon-based polymer, an acrylic polymer, a polyolefin-based polymer, and a copolymer thereof. Specifically, the substrate 301 can be formed of polyimide (PI). Polyimide (PI) is widely used for a plastic substrate because it can be applied to a high-temperature process and can be coated.

When the substrate 301 is formed of polyimide (PI), a manufacturing process of the touch display device 100 can be performed using a glass supporting substrate disposed under the substrate 301, and the supporting substrate can be removed after the manufacturing process of the touch display device 100 is completed. Further, after the supporting substrate is removed, a back plate for supporting the substrate 301 can be disposed under the substrate 301.

In addition, as shown in FIG. 5, the driving transistor DRT includes a gate electrode 303, an active layer 307, a drain electrode 309, and a source electrode 311, and is for driving the light emitting element ED. The driving transistor DRT can be a bottom gate structure in which the gate electrode 303, a gate insulation layer 305, the active layer 307, the drain electrode 309, and the source electrode 311 are sequentially stacked.

Also, the gate electrode 303 can be formed of a metallic material, e.g., any one of molybdenum (Mo), aluminum (Al), chromium (Cr), gold (Au), titanium (Ti), nickel (Ni), neodymium (Nd), and copper (Cu), or an alloy thereof, but is not limited thereto. Further, the gate electrode 303 can have a single layer or multiple layers. In addition, the gate insulation layer 305 can be disposed on the substrate 301 to cover the gate electrode 303. The gate insulation layer 305 insulates the gate electrode 303 and the active layer 307 from each other and can be formed of an insulative inorganic material such as silicon oxide (SiOx) or silicon nitride (SiNx), or can be formed of an insulative organic material.

Further, the active layer 307 can be disposed on the gate insulation layer 305 and be formed of polycrystalline silicon. In this instance, a partial area can be doped with impurities. Further, the active layer 307 can be formed of amorphous silicon, an organic semiconductor material, or oxide.

In addition, as shown in FIG. 5, the source electrode 311 and the drain electrode 309 can be disposed on the gate insulation layer 305 and the active layer 307. The source electrode 311 and the drain electrode 309 can be formed of a metallic material, and be formed of, e.g., any one of molybdenum (Mo), aluminum (Al), chromium (Cr), gold (Au), titanium (Ti), nickel (Ni), neodymium (Nd), and copper (Cu), or an alloy thereof, but are not limited thereto. Further, the source electrode 311 and the drain electrode 309 can have a single layer or multiple layers.

A planarization layer 313 is also disposed on the driving transistor DRT and is an insulation layer for protecting the driving transistor DRT and planarizing an upper portion of the driving transistor DRT. The planarization layer 313 can also include a contact hole for electrically connecting the driving transistor DRT and the anode electrode 319 of the light emitting element ED. Specifically, the planarization layer 313 includes a contact hole exposing any one of the source electrode 311 or the drain electrode 309 of the driving transistor DRT. The planarization layer 313 can be formed of an organic insulating material and include a single layer or double or multiple layers.

As shown in FIG. 5, the color filters 315 can be disposed on the planarization layer 313 at a position corresponding to the light emitting area. In addition, a color filter 315 can be formed to emit red, green, blue, and white colors. The color filters 315 of each color can also be sequentially arranged in a horizontal direction or a vertical direction, or be alternately arranged.

Further, as shown, the infrared fluorescent pattern 330 capable of scattering infrared light incident from the outside can be formed on the color filter 315. In particular, the infrared fluorescent pattern 330 can be formed on a color filter at a specific position among the color filters 315, and various encryption patterns can be formed. For example, infrared fluorescent patterns 330 in an area including subpixels can be one encrypted pattern indicating a corresponding position, and the corresponding position can be recognized/detected by a stylus or the like.

Further, the infrared fluorescent pattern 330 can be formed to have the same width as the color filter 315, or can be formed to have a different width from the color filter 315. At least a portion of the infrared fluorescent pattern 330 can also be positioned to overlap the color filter 315. Also, when the infrared fluorescent pattern 330 is formed to have the same width as the color filter 315, a mask used to form the color filter 315 can be used, thereby increasing the efficiency of the process.

An overcoat layer 317 can also be positioned on the planarization layer 313 to cover the infrared fluorescent pattern 330. As shown, the light emitting element ED is disposed on the overcoat layer 317, is driven by the driving transistor DRT and includes an anode electrode 319 and a cathode electrode 325 facing each other, and a light emitting layer 323 interposed therebetween. As shown, the light emitting area of the light emitting element ED can be defined by a bank 321.

In addition, as shown in FIG. 5, the anode electrode 319 is electrically connected to the driving transistor DRT. Specifically, the anode electrode 319 can be connected to any one of the source electrode 309 or the drain electrode 311 of the driving transistor DRT through a contact hole formed in the overcoat layer 317 and the planarization layer 313. Here, the anode electrode 319 is electrically connected to the drain electrode 311 of the driving transistor DRT. In this instance, an image signal for displaying an image signal is applied to the anode electrode 319 through the drain electrode 311.

Since the anode electrode 319 supplies holes to the light emitting layer 323, the anode electrode 319 is formed of a conductive material having a high work function. For example, the anode electrode 319 can be formed of a transparent conductive oxide (TCO) such as indium tin oxide (ITO). When the touch display device 100 is a bottom emission type organic light emitting display device, the anode electrode 319 can be formed of a transparent conductive layer including a reflective layer having high reflectivity on an upper portion thereof.

Further, the anode electrodes 319 are disposed on the overcoat layer 317 to be spaced apart from each other for each subpixel. The light emitting layer 323 is also disposed on the anode electrode 319 and can be formed of a phosphorescent or fluorescent material. The light emitting layer 323 can further include a hole injection layer, a hole transport layer, an electron transport layer, an electron injection layer, or the like. The light emitting layer 323 can include a material capable of emitting light of a specific color. For example, the light emitting layer 323 can include a light emitting material capable of emitting any one of red, green, and blue light. However, the disclosure is not limited thereto, and the light emitting layer 323 can include a light emitting material capable of emitting light of a different color.

In addition, as shown in FIG. 5, the cathode electrode 325 is disposed to face the anode electrode 319 with the light emitting layer 323 interposed therebetween. In more detail, the cathode electrode 325 supplies electrons to the light emitting layer 323 and can be formed of a metallic material having a low work function, such as a metal alloy such as MgAg, a metal alloy including ytterbium (Yb), or the like.

Further, the bank 321 is disposed on the overcoat layer 317 for the remaining area except for the light emitting area. In other words, the bank 321 can be disposed to cover only a portion of the anode electrode 319 to expose a portion of the anode electrode 319, and an area corresponding to a portion of the anode electrode 319 exposed by the bank 321 can be defined as a light emitting area. The bank 321 can also be formed of an inorganic insulating material such as silicon oxide or silicon nitride, or an organic insulating material such as an acrylic resin or an imide resin.

In addition, an encapsulation layer can be disposed on the cathode electrode 325 of the light emitting element ED. In particular, the encapsulation layer is a component for protecting the light emitting element ED vulnerable to moisture from being exposed to moisture. For example, the encapsulation layer can be formed of a structure in which an inorganic layer and an organic layer are alternately stacked, or a structure in which an inorganic layer/organic layer/inorganic layer are stacked, but is not limited thereto.

In addition, as shown in FIG. 5, when the touch display device 100 is a bottom emission structure, the infrared control film 340 can be formed under the substrate 301 corresponding to the light emitting surface. Thus, the infrared light IRin incident from the infrared stylus 200 is transferred as infrared light IR2 reflected from the metal electrode including the reflective layer, such as the anode electrode 319 positioned inside the display panel 110 or the gate electrode 303 of the driving transistor DRT.

In this instance, the infrared light IRin incident into the display panel 110 can be converted into linearly polarized light in a specific direction through the infrared control film 340, and the infrared light IR2 reflected from the inner metal electrode (anode electrode, gate electrode, etc.) can be canceled to be extinguished at the infrared control film 340 through a phase delay process. On the other hand, since the infrared light IR1 transferred through the infrared fluorescent pattern 330 inside the display panel 110 is totally reflected by the infrared fluorescent pattern 330, the infrared light IR1 is not canceled while being transferred to the outside through the infrared control film 340.

As a result, the infrared stylus 200 can effectively detect touch coordinates by detecting reflected infrared light of a specific pattern through the infrared fluorescent pattern 330 formed inside the display panel 110 and the infrared control film 340 positioned on the light emitting surface.

Figure 6:
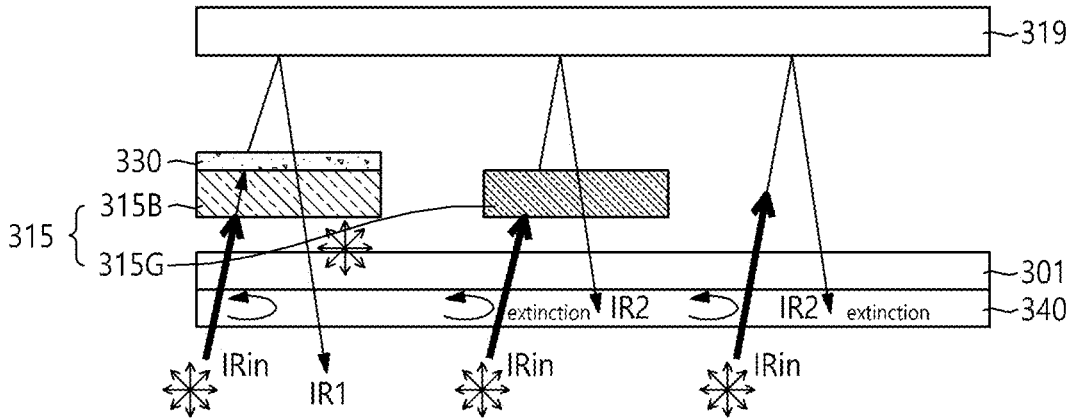
FIG. 6 is a view illustrating a concept of detecting reflected infrared light reflected inside a display panel in a touch display device according to embodiments of the disclosure.
Figure 7:
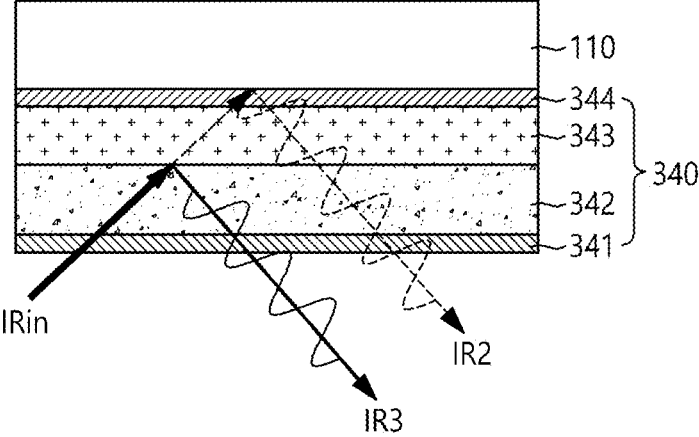
FIG. 7 is a view illustrating a concept of destructive interference of infrared light by an infrared control film in a touch display device according to embodiments of the disclosure.
Figure 7:
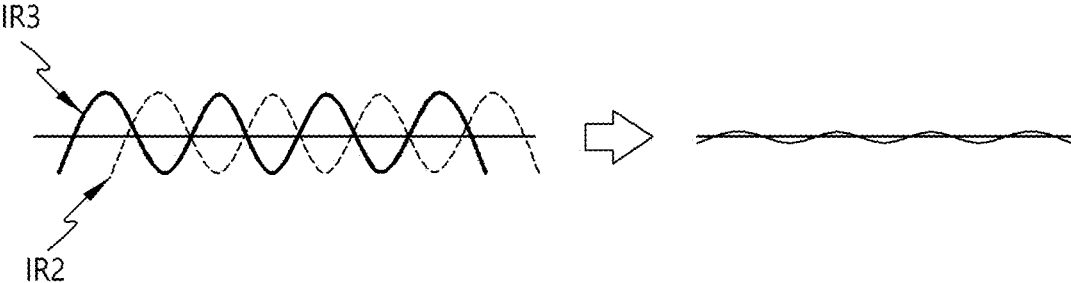

Next, FIG. 6 is a view illustrating a concept of detecting reflected infrared light reflected inside a display panel in a touch display device and FIG. 7 is a view illustrating a concept of destructive interference of infrared light by an infrared control film in a touch display device according to embodiments of the disclosure.

Referring to FIGS. 6 and 7, the touch display device 100 can include an infrared control film 340 disposed on a light emitting surface of the display panel 110 and an infrared fluorescent pattern 330 disposed inside the display panel 110. The infrared fluorescent pattern 330 can be formed on the color filter 315 positioned inside the display panel 110.

Figure 8:
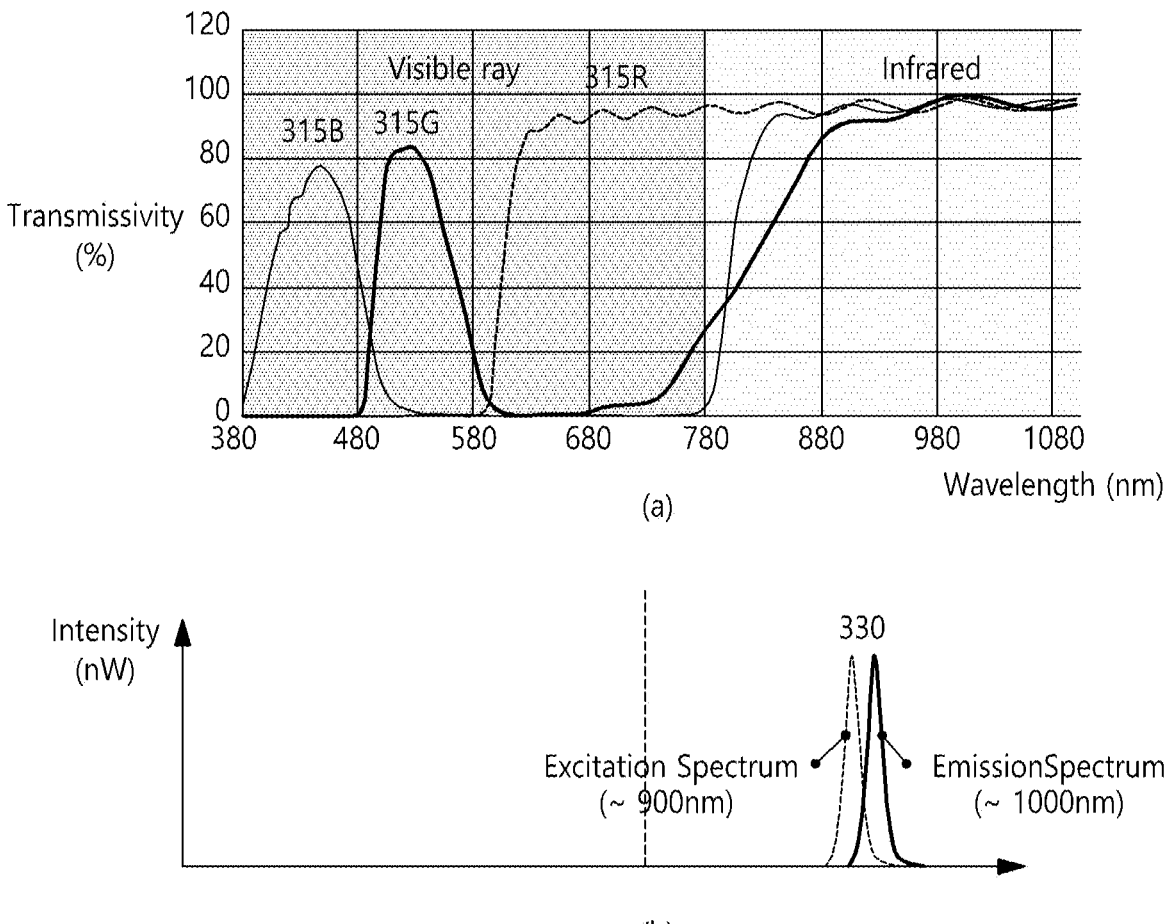
FIG. 8 is a view illustrating an example of a transmissivity of a color filter and absorption and light emission spectrum of an infrared fluorescent pattern in a touch display device according to embodiments of the disclosure.

In addition, FIG. 8 is a view illustrating an example of a transmissivity of a color filter and absorption and light emission spectrum of an infrared fluorescent pattern in a touch display device according to embodiments of the disclosure. In FIG. 8, the infrared fluorescent pattern 330 is formed on the color filter 315.

Therefore, it is preferable that the color filter 315 is formed of a material capable of transmitting infrared light incident through the light emitting surface. For example, as shown in FIG. 8, the blue color filter 315B not only has a high transmissivity for blue visible light of about 400 nm, but also has a high transmissivity for infrared light of about 780 nm or more. Further, the green color filter 315G not only has a high transmissivity for green visible light of about 520 nm, but also has a high transmissivity for infrared light of about 780 nm or more. Further, the red color filter 315G has a high transmissivity for red visible light and infrared light of about 600 nm or more.

Accordingly, infrared light incident through the light emitting surface of the display panel 110 can be transmitted through the color filter 315 to the upper infrared fluorescent pattern 330. The infrared fluorescent pattern 330 can absorb a wavelength of about 900 nm from infrared light transferred through the color filter 315 and emit infrared light having a wavelength of about 1000 nm. Accordingly, the infrared light emitted through the infrared fluorescent pattern 330 can be infrared light having a wavelength longer than the incident infrared light.

In addition, the infrared fluorescent pattern 330 can be formed on the color filters 315 of all of the colors (e.g., red, green, and blue), or can be formed on the color filters of some colors. FIG. 6 illustrates an example in which the infrared fluorescent pattern 330 is formed on the blue color filter 315B and is not formed on the green color filter 315G. In addition, the infrared fluorescent pattern 330 can be formed on the blue color filter 315B to have the same width as the blue color filter 315B, or can be formed to be wider or narrower than the width of the blue color filter 315B. At least a portion of the infrared fluorescent pattern 330 can be positioned to overlap the blue color filter 315B.

Further, when the infrared fluorescent pattern 330 is formed to have the same width as the blue color filter 315B, the same mask used to form the blue color filter 315B can be used, thereby simplifying the process and achieving process optimization. As shown in FIG. 6, the infrared control film 340 can be formed on the surface of the substrate 301. In addition, as shown in FIG. 7, the infrared control film 340 can include a base film 341, a first polarizing layer 342, a second polarizing layer 343, and an adhesive layer 344. The base film 341 can be formed of a tri-acetyl-cellulose (TAC) film or a polyester (PET) film.

Further, the first polarizing layer 342 is a portion that converts infrared light incident through the light emitting surface into linearly polarized light in a specific direction. For example, the first polarizing layer 342 can be formed of a polyvinylbutyral resin (PVB), a polyvinyl alcohol resin (PVA), or an ethylene-vinyl acetate copolymer resin (EVA). Also, the second polarizing layer 343 can be formed of a quarter wavelength plate that delays infrared light converted into linearly polarized light by ¼ wavelength through the first polarizing layer 342.

Accordingly, as shown in FIG. 7, infrared light IRin incident on the display panel 110 is delayed by ¼ wavelength by the second polarizing layer 343, and is reflected by a metal electrode (e.g., anode electrode 319) inside the display panel 110 to passing through the second polarizing layer 343 again, and is thus delayed by ½ wavelength. As a result, as shown in FIG. 7, the infrared light IR3 passing through the first polarizing layer 342 and reflected by the second polarizing layer 343 and the infrared light IR2 reflected by the metal electrode 319 of the display panel 110 and passed through the second polarizing layer 343 have opposite phases, causing destructive interference.

Accordingly, most of the infrared light incident through the light emitting surface of the display panel 110 are canceled to be extinguished inside the infrared control film 340. On the other hand, as shown in FIG. 6, the infrared light IR1 incident into the display panel 110 and transmitted through the infrared fluorescent pattern 330 is totally reflected by the infrared fluorescent pattern 330, and thus does not cause destructive interference due to the phase difference while being reflected to the outside through the infrared control film 340.

As a result, the infrared stylus 200 can detect a difference between the infrared light IR1 reflected through the infrared fluorescent pattern 330 and the infrared light IR2 canceled at the infrared control film 340, and generate touch coordinates of the infrared stylus 200.

In addition, the adhesive layer 344 serves to couple the infrared control film 340 to the display panel 110 and can include a base resin, a crosslinking agent, a binder, and an additive. The base resin is a polymer material formed of an acrylic monomer, and can be, e.g., alkyl acrylate having 4 to 17 carbon atoms. The base resin can also include the functional group monomer that regulates the polar group and reacts with the crosslinking agent.

Further, the crosslinking agent can connect linear copolymer chains to form a three-dimensional network structure, and enhance the cohesion of the adhesive layer 344 to enhance heat resistance performance. Also, the binder forms a strong bonding force to a portion (e.g., a substrate) to which the adhesive layer 344 is bonded. In particular, the binder can enhance the bonding force with the adhesive layer 344, which is an organic material, when the bonded portion is an inorganic material. The additive also prevents charging of the adhesive layer 344, and a dye or pigment for controlling transmissivity can be injected.

Figure 9:
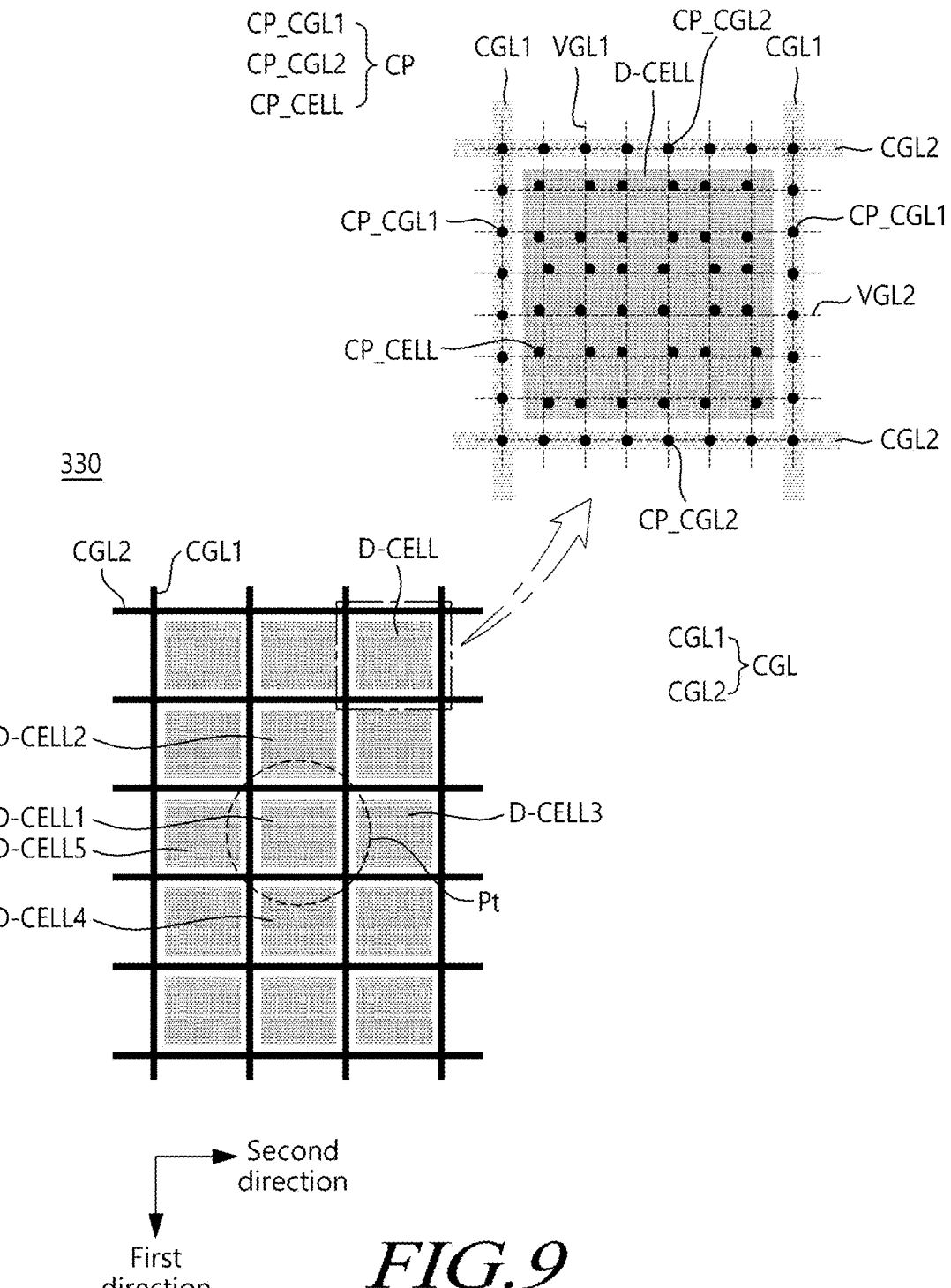
FIG. 9 is a view illustrating a configuration of an infrared fluorescent pattern in a display panel according to embodiments of the disclosure.

Next, FIG. 9 is a view illustrating a configuration of an infrared fluorescent pattern in a display panel according to embodiments of the disclosure. Referring to FIG. 9, the infrared fluorescent pattern 330 can include a cell area D-CELL positioned between guide lines CGL.

For example, the infrared fluorescent pattern 330 can include cell areas D-CELL arranged in rows and columns, first guide lines CGL1 disposed between adjacent cell areas D-CELL in a second direction, and second guide lines CGL2 disposed between adjacent cell areas D-CELL in a first direction. Also, the first guide lines CGL1 can extend in the first direction, and the second guide lines CGL2 can extend in the second direction.

In addition, the infrared fluorescent patterns 330 can include first guide patterns CP_CGL1 for indicating the plurality of first guide lines CGL1, respectively, second guide patterns CP_CGL2 for indicating the second guide lines CGL2, respectively, and cell patterns CP_CELL disposed in the cell areas D-CELL, respectively, and arranged in rows and columns. The arrangement shape of the cell patterns CP_CELL can be different for each of the cell areas D-CELL.

Further, the cell patterns CP_CELL included in each of the cell areas D-CELL can be arranged in a matrix form of m rows and n columns. In each of the cell areas D-CELL, the cell patterns CP_CELL can be arranged along virtual grid lines VGL1 and VGL2 of m rows and n columns. Each of the cell areas D-CELL can correspond to one coordinate data. Also, the overall arrangement position of the cell patterns CP_CELL included in each of the cell areas D-CELL can represent one coordinate data. Accordingly, the cell patterns CP_CELL can be arranged in m rows and n columns for each of the cell areas D-CELL, and the arrangement positions can be slightly different.

In addition, the cell patterns CP_CELL included in each of the cell areas D-CELL can have a unique array shape (also referred to as a unique array position pattern) corresponding to unique coordinates. The unique array position pattern of the cell patterns CP_CELL included in each of the cell areas D-CELL can be an encrypted encryption pattern representing one unique coordinate. For example, each of the cell areas D-CELL can include 36 cell patterns CP_CELL arranged in six rows and six columns and arranged in a unique pattern to represent (code) unique coordinates.

In addition, the first cell area D-CELL1 can include 36 cell patterns CP_CELL to represent the first coordinates, and the second cell area D-CELL2 can include 36 cell patterns CP_CELL to represent the second coordinates. Further, the third cell area D-CELL3 can include 36 cell patterns CP_CELL to represent the third coordinates, and the fourth cell area D-CELL4 can include 36 cell patterns CP_CELL to represent the fourth coordinates. The fifth cell area D-CELLS can also include 36 cell patterns CP_CELL to represent fifth coordinates.

In addition, the array position of the 36 cell patterns CP_CELL included in the first cell area D-CELL1 can be an encrypted encryption pattern indicating the first coordinates, the array position of the 36 cell patterns CP_CELL included in the second cell area D-CELL2 can be an encrypted encryption pattern indicating the second coordinates, the array position of the 36 cell patterns CP_CELL included in the third cell area D-CELL3 can be an encrypted encryption pattern indicating the third coordinates, the array position of the 36 cell patterns CP_CELL included in the fourth cell area D-CELL4 can be an encrypted encryption pattern indicating the fourth coordinates, and the array position of the 36 cell patterns CP_CELL included in the fifth cell area D-CELLS can be an encrypted encryption pattern indicating the fifth coordinates.

In other words, the first coordinates corresponding to the first cell area D-CELL1, the second coordinates corresponding to the second cell area D-CELL2, the third coordinates corresponding to the third cell area D-CELL3, the fourth coordinates corresponding to the fourth cell area D-CELL4, and the fifth coordinates corresponding to the fifth cell area D-CELLS are all different. Accordingly, the array position of the 36 cell patterns CP_CELL included in the first cell area D-CELL1, the array position of the 36 cell patterns CP_CELL included in the second cell area D-CELL2, the array position of the 36 cell patterns CP_CELL included in the third cell area D-CELL3, the array position of the 36 cell patterns CP_CELL included in the fourth cell area D-CELL4, and the array position of the 36 cell patterns CP_CELL included in the fifth cell area D-CELLS can all be different from each other.

Also, each of the cell areas D-CELL can correspond to a partial area of the display area DA. Each cell area D-CELL can also overlap a group of two or more subpixels among a plurality of subpixels included in the display area DA. For example, the first cell area D-CELL1 can overlap a first group including two or more first subpixels, and the second cell area D-CELL2 can overlap a second group including two or more second subpixels. Two or more first subpixels included in the first group and two or more second subpixels included in the second group can be different from each other.

In addition, the infrared stylus can recognize the infrared fluorescent patterns 330 based on the reflected light, can recognize the first guide lines CGL1 and the second guide lines CGL2 based on the recognition result, and can recognize the cell areas D-CELL partitioned by the first guide lines CGL1 and the second guide lines CGL2.

The infrared stylus can also recognize the array position of the cell patterns CP_CELL included in at least one of the cell areas D-CELL, and can determine the position (touch position) of the infrared stylus based on the recognition result. For example, when the infrared stylus touches the position Pt centered on the first cell area D-CELL1, the infrared stylus can recognize the array position of the cell patterns CP_CELL included in each of the first to fifth cell areas D-CELL1 to D-CELL5 based on the sensing result of the reflected light having a difference in shade or wavelength, and can calculate a more precise touch position based on the difference in signal intensity between the reflected light and the first to fifth coordinates corresponding to the first to fifth cell areas D-CELL1 to D-CELL5.

Figure 10:
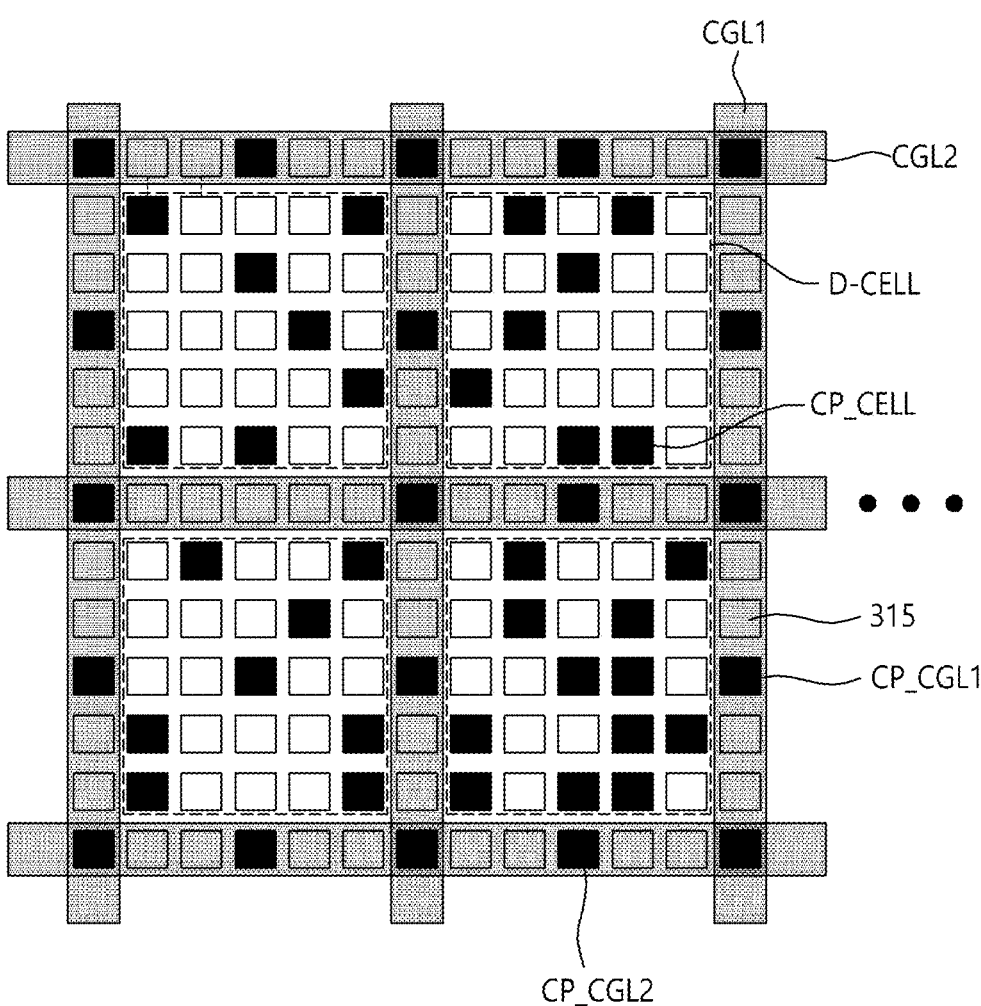
FIG. 10 is a view illustrating a placement of an infrared fluorescent pattern in a touch display device according to embodiments of the disclosure.

Next, FIG. 10 is a view illustrating a placement of an infrared fluorescent pattern in a touch display device according to embodiments of the disclosure. Referring to FIG. 10, the infrared fluorescent pattern 330 can be formed as an encryption pattern that reflects infrared light on the color filter 315 at a specific position.

Further, the infrared fluorescent pattern 330 can include a guide line CGL for distinguishing the cell area D-CELL in which the encryption pattern is positioned. As shown in FIG. 10, guide line CGL can include guide patterns CP_CGL1 and CP_CGL2 arranged at regular intervals to distinguish the cell areas D-CELL. For example, the guide line CGL can be formed so that one first guide pattern CP_CGL1 and the second guide pattern CP_CGL2 are arranged at an interval of two color filters 315.

In addition, the inner space of the guide line CGL corresponds to the cell area D-CELL in which the encryption pattern is positioned. The cell area D-CELL can also include different cell patterns CP_CELL for each area divided by the first guide line CGL1 and the second guide line CGL2.

Further, the cell pattern CP_CELL positioned in the cell area D-CELL can correspond to a pattern value determined according to the formed position. For example, the cell pattern can correspond to a designated pattern value depending on the direction in which the encryption pattern is positioned among the upper, lower, left, and right directions from the intersection of the virtual grating lines in the cell area D-CELL.

In this instance, each pattern value can be converted into a first bit value of the X coordinate and a second bit value of the Y coordinate. By combining the corresponding information as described above, coordinates on the surface of the display panel 110 where the infrared fluorescent pattern 330 is formed can be determined.

FIG. 10 illustrates 5×5 encryption patterns are disposed in the cell area D-CELL including horizontal and vertical areas having a predetermined length, so that it can be formed to have different cell patterns CP_CELL no matter which direction the pattern distribution is detected in. Also, the unit gratings formed by these 25 patterns can represent different position coordinates on the surface of the display panel 110. For example, when the cell area D-CELL is formed with 5×5 encryption patterns in the display panel 110 having a UHD resolution (3840×2160), $2^{25}$ pieces of information can be recorded through the cell area D-CELL, and up to 230,400 cell areas 334 can be formed. Accordingly, the infrared stylus 200 can detect a pattern value corresponding to the infrared fluorescent pattern 330 by photographing reflected infrared light reflected from the display panel 110 through the infrared sensor 210.

Figure 11:
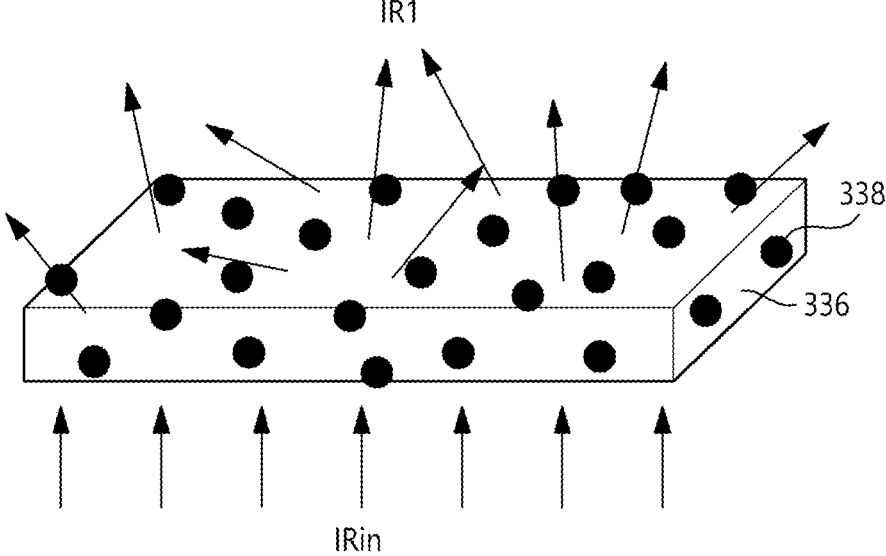
FIG. 11 is a view illustrating an internal structure of an infrared fluorescent pattern according to embodiments of the disclosure.

Next, FIG. 11 is a view illustrating an internal structure of an infrared fluorescent pattern according to embodiments of the disclosure. Referring to FIG. 11, the infrared fluorescent pattern 330 can include a phosphor body 336 and an infrared fluorescent pigment 338.

Also, the phosphor body 336 can be formed of a photoresist formed of the same material as the color filter, and the infrared fluorescent pigment 338 can have circular particles and can be positioned inside the phosphor body 336. As such, the infrared fluorescent pigment 338 positioned inside the phosphor body 336 serves to disperse infrared light incident from the outside to disorder the polarization of infrared light.

In this instance, the effect of being dispersed by the infrared fluorescent pigment 338 can be proportional to the particle size of the infrared fluorescent pigment 338. Thus, the touch display device 100 according to the disclosure can obtain an effect of strongly dispersing infrared light by maintaining the diameter of the infrared fluorescent pigment 338 at a level of 2 to 3 μm. In addition, the touch display device 100 according to embodiments of the disclosure can be formed so that the color filter 315 serves as an infrared fluorescent pattern by injecting the infrared fluorescent pigment 338 into the color filter 315.

Figure 12:
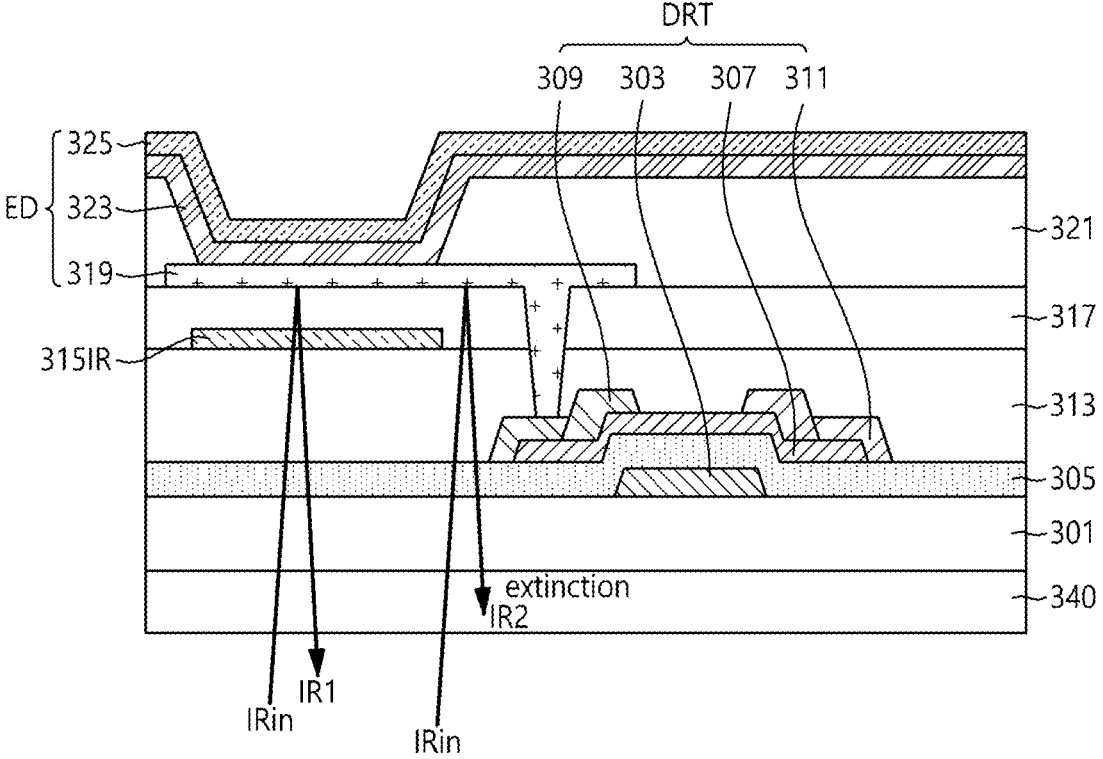
FIG. 12 is a cross-sectional view schematically illustrating a touch display device according to another embodiment of the disclosure.

Next, FIG. 12 is a cross-sectional view schematically illustrating a touch display device according to another embodiment of the disclosure. Referring to FIG. 12, a touch display device 100 according to another embodiment of the disclosure can include a substrate 301, a driving transistor DRT, a color filter 315IR for infrared reflection, a light emitting element ED, and an infrared control film 340.

Here, the driving transistor DRT is illustrated as an example, but the switching transistors SWT1 and SWT2 can have a structure similar to that of the driving transistor DRT depending on the position. In addition, the substrate 301 can have a flexible characteristic (e.g., bendable, unbreakable, rollable, foldable characteristic, or the like). The substrate 301 can also be formed of a transparent glass material or plastic.

Further, the driving transistor DRT includes a gate electrode 303, an active layer 307, a drain electrode 309, and a source electrode 311, and is for driving the light emitting element ED. The driving transistor DRT can be a bottom gate structure in which the gate electrode 303, the gate insulation layer 305, the active layer 307, the drain electrode 309, and the source electrode 311 are sequentially stacked.

In addition, the gate insulation layer 305 can be disposed on the substrate 301 to cover the gate electrode 303. Thus, the gate insulation layer 305 insulates the gate electrode 303 and the active layer 307 from each other. Further, the active layer 307 can be disposed on the gate insulation layer 305 and can be formed of polycrystalline silicon. In this instance, a partial area can be doped with impurities. Further, the active layer 307 can be formed of amorphous silicon, an organic semiconductor material, or oxide.

In addition, the source electrode 311 and the drain electrode 309 can be disposed on the gate insulation layer 305 and the active layer 307. Further, the source electrode 311 and the drain electrode 309 can be formed of an infrared reflection electrode that reflects infrared light. The infrared reflective electrode can also have a structure in which an oxide such as silicon oxide (SiO2) or titanium oxide (TiO2) is deposited as a multilayer thin film.

As shown, a planarization layer 313 is also disposed on the driving transistor DRT. Thus, the planarization layer 313 is an insulation layer for protecting the driving transistor DRT and planarizing an upper portion of the driving transistor DRT. The planarization layer 313 can also include a contact hole for electrically connecting the driving transistor DRT and the anode electrode 319 of the light emitting element ED.

In addition, color filters can be disposed on the planarization layer 313 at a position corresponding to the light emitting area. In particular, the color filter can be formed to emit light in red, green, blue, and white colors. In this instance, some of the color filters can be formed of an infrared reflective color filter 315IR into which an infrared fluorescent pigment is injected. The color filter 315IR for infrared reflection can disorderly diffusely reflect infrared light IRin incident through the light emitting surface of the display panel 110 by an infrared fluorescent pigment. Accordingly, since the infrared light IR1 passing through the color filter 315IR for infrared reflection is in a non-polarized state due to diffuse reflection, the infrared light IR1 can be transferred to the outside without being canceled when passing through the infrared control film 340.

In addition, the color filter 315IR for reflecting infrared light can be formed only at a specific location to form various encryption patterns. An overcoat layer 317 can also be positioned on the planarization layer 313 to cover the color filter and the color filter 315IR for infrared reflection. Further, the light emitting element ED is disposed on the overcoat layer 317. The light emitting element ED is also driven by the driving transistor DRT and includes an anode electrode 319 and a cathode electrode 325 facing each other, and a light emitting layer 323 interposed therebetween. The light emitting area of the light emitting element ED can also be defined by a bank 321.

In addition, the anode electrode 319 is electrically connected to the driving transistor DRT. Specifically, the anode electrode 319 can be connected to any one of the source electrode 309 or the drain electrode 311 of the driving transistor DRT through a contact hole formed in the overcoat layer 317 and the planarization layer 313. Here, the anode electrode 319 is electrically connected to the drain electrode 311 of the driving transistor DRT. In this instance, an image signal for displaying an image signal is applied to the anode electrode 319 through the drain electrode 311.

In addition, the anode electrodes 319 are disposed on the overcoat layer 317 to be spaced apart from each other for each subpixel. Further, the light emitting layer 323 is disposed on the anode electrode 319. The light emitting layer 323 can also be formed of a phosphorescent or fluorescent material, and can further include a hole injection layer, a hole transport layer, an electron transport layer, an electron injection layer, or the like, if necessary.

Further, the cathode electrode 325 is disposed to face the anode electrode 319 with the light emitting layer 323 interposed therebetween. The cathode electrode 325 supplies electrons to the light emitting layer 323.

In addition, the bank 321 is disposed on the overcoat layer 317 for the remaining area except for the light emitting area. In other words, the bank 321 can be disposed to cover only a portion of the anode electrode 319 to expose a portion of the anode electrode 319, and an area corresponding to a portion of the anode electrode 319 exposed by the bank 321 can be defined as a light emitting area.

Also, an encapsulation layer can be disposed on the cathode electrode 325 of the light emitting element ED. In addition, when the touch display device 100 is a bottom emission structure, the infrared control film 340 can be formed under the substrate 301 corresponding to the light emitting surface.

Infrared rays IRin incident from the infrared stylus 200 are reflected from a metal electrode including a reflective layer, such as the anode electrode 319 positioned inside the display panel 110 or the gate electrode 303 of the driving transistor DRT. In this instance, the infrared light IRin incident into the display panel 110 can be converted into linearly polarized light in a specific direction through the infrared control film 340, and the infrared light IR2 reflected from the inner metal electrode (anode electrode, gate electrode, etc.) can be canceled out to be extinguished at the infrared control film 340 through a phase delay process.

On the other hand, since the infrared light IR1 transferred through the infrared reflection color filter 315IR inside the display panel 110 is totally reflected by the infrared reflection color filter 315IR, the infrared light IR1 is not canceled or extinguished while being transferred to the outside through the infrared control film 340. As a result, the infrared stylus 200 can effectively detect touch coordinates by detecting reflected infrared light of a specific pattern through the infrared reflective color filter 315IR formed inside the display panel 110 and the infrared control film 340 positioned on the light emitting surface. In addition, the touch display device 100 according to embodiments of the disclosure can form an infrared fluorescent pattern 330 under the color filter 315.

Figure 13:
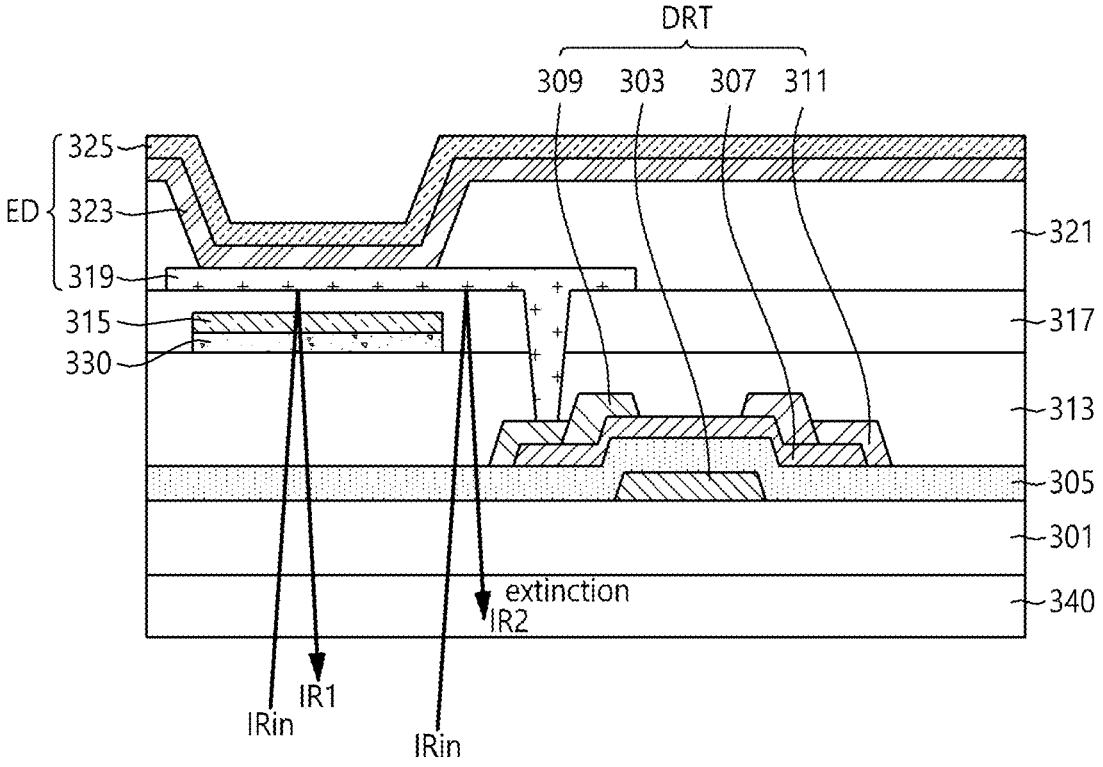
FIG. 13 is a cross-sectional view schematically illustrating a touch display device according to another embodiment of the disclosure.

Next, FIG. 13 is a cross-sectional view schematically illustrating a touch display device according to another embodiment of the disclosure. Referring to FIG. 13, the touch display device 100 according to still another embodiment of the disclosure can include a substrate 301, a driving transistor DRT, a color filter 315, a light emitting element ED, an infrared fluorescent pattern 330, and an infrared control film 340.

Here, the driving transistor DRT is illustrated as an example, but the switching transistors SWT1 and SWT2 can have a structure similar to that of the driving transistor DRT depending on the position. The substrate 301 can also have a flexible characteristic such as a bendable, unbreakable, rollable, foldable characteristic, or the like. The substrate 301 can also be formed of a transparent glass material or plastic.

In addition, the driving transistor DRT includes a gate electrode 303, an active layer 307, a drain electrode 309, and a source electrode 311, and is for driving the light emitting element ED. The driving transistor DRT can also be a bottom gate structure in which the gate electrode 303, the gate insulation layer 305, the active layer 307, the drain electrode 309, and the source electrode 311 are sequentially stacked.

Further, the gate insulation layer 305 can be disposed on the substrate 301 to cover the gate electrode 303. Thus, the gate insulation layer 305 insulates the gate electrode 303 and the active layer 307 from each other. The gate insulation layer 305 can be formed of an insulative inorganic material such as silicon oxide (SiOx) or silicon nitride (SiNx), or can be formed of an insulative organic material.

In addition, the active layer 307 can be disposed on the gate insulation layer 305 and can be formed of polycrystalline silicon. In this instance, a partial area can be doped with impurities. Further, the active layer 307 can be formed of amorphous silicon, an organic semiconductor material, or oxide. The source electrode 311 and the drain electrode 309 can be disposed on the gate insulation layer 305 and the active layer 307. Also, a source electrode 311 and the drain electrode 309 can be formed of an infrared reflection electrode that reflects infrared light.

A planarization layer 313 is also disposed on the driving transistor DRT. The planarization layer 313 is thus an insulation layer for protecting the driving transistor DRT and planarizing an upper portion of the driving transistor DRT. The planarization layer 313 can also include a contact hole for electrically connecting the driving transistor DRT and the anode electrode 319 of the light emitting element ED.

An infrared fluorescent pattern 330 capable of scattering infrared light incident from the outside can also be formed on the planarization layer 313. In particular, the infrared fluorescent pattern 330 can be formed to correspond to some color filters among the color filters 315, and various encryption patterns can be formed.

Further, color filters 315 can be disposed at a position corresponding to the light emitting area. The color filter 315 can also be formed to emit red, green, blue, and white colors. The color filters 315 of each color can be sequentially arranged in a horizontal direction or a vertical direction, or can be alternately arranged. Some color filters 315 can be positioned above the infrared fluorescent pattern 330.

In addition, the infrared fluorescent pattern 330 can be formed to have the same width as the color filter 315, or can be formed to have a different width from the color filter 315. When the infrared fluorescent pattern 330 is formed to have the same width as the color filter 315, a mask used to form the color filter 315 can be used, thereby increasing the efficiency of the process. An overcoat layer 317 can also be positioned on the planarization layer 313 to cover the color filter 315.

Further, the light emitting element ED is disposed on the overcoat layer 317. The light emitting element ED is driven by the driving transistor DRT and includes an anode electrode 319 and a cathode electrode 325 facing each other, and a light emitting layer 323 interposed therebetween. Also, the light emitting area of the light emitting element ED can be defined by a bank 321.

In addition, the anode electrode 319 is electrically connected to the driving transistor DRT. Specifically, the anode electrode 319 can be connected to any one of the source electrode 309 or the drain electrode 311 of the driving transistor DRT through a contact hole formed in the overcoat layer 317 and the planarization layer 313. Here, the anode electrode 319 is electrically connected to the drain electrode 311 of the driving transistor DRT. In this instance, an image signal for displaying an image signal is applied to the anode electrode 319 through the drain electrode 311.

Since the anode electrode 319 must supply holes to the light emitting layer 323, the anode electrode 319 is formed of a conductive material having a high work function. For example, the anode electrode 319 can be formed of a transparent conductive oxide (TCO) such as indium tin oxide (ITO). When the touch display device 100 is a bottom emission type organic light emitting display device, the anode electrode 319 can be formed of a transparent conductive layer including a reflective layer having high reflectivity on an upper portion thereof. The anode electrodes 319 are disposed on the overcoat layer 317 to be spaced apart from each other for each subpixel.

In addition, the light emitting layer 323 is disposed on the anode electrode 319. The light emitting layer 323 can be formed of a phosphorescent or fluorescent material, and can further include a hole injection layer, a hole transport layer, an electron transport layer, an electron injection layer, or the like, if needed. The light emitting layer 323 can also include a material capable of emitting light of a specific color. For example, the light emitting layer 323 can include a light emitting material capable of emitting any one of red, green, and blue light. However, the disclosure is not limited thereto, and the light emitting layer 323 can include a light emitting material capable of emitting light of a different color.

In addition, the cathode electrode 325 is disposed to face the anode electrode 319 with the light emitting layer 323 interposed therebetween. The cathode electrode 325 also supplies electrons to the light emitting layer 323. For example, the cathode electrode 325 can be formed of a metallic material having a low work function, such as a metal alloy such as MgAg, a metal alloy including ytterbium (Yb), or the like.

Further, the bank 321 is disposed on the overcoat layer 317 for the remaining area except for the light emitting area. In other words, the bank 321 can be disposed to cover only a portion of the anode electrode 319 to expose a portion of the anode electrode 319, and an area corresponding to a portion of the anode electrode 319 exposed by the bank 321 can be defined as a light emitting area.

An encapsulation layer can also be disposed on the cathode electrode 325 of the light emitting element ED. The encapsulation layer is a component for protecting the light emitting element ED vulnerable to moisture from being exposed to moisture.

In addition, when the touch display device 100 is a bottom emission structure, the infrared control film 340 can be formed under the substrate 301 corresponding to the light emitting surface. Infrared rays IRin incident from the infrared stylus 200 are reflected from a metal electrode including a reflective layer, such as the anode electrode 319 positioned inside the display panel 110 or the gate electrode 303 of the driving transistor DRT.

In this instance, the infrared light IRin incident on the inside of the display panel 110 can be converted into linearly polarized light in a specific direction through the infrared control film 340, and the infrared light IR2 reflected from the inner metal electrode (anode electrode or gate electrode) can be canceled to be extinguished at the infrared control film 340 through a phase delay process.

On the other hand, since the infrared light IR1 transferred through the infrared fluorescent pattern 330 inside the display panel 110 is totally reflected by the infrared fluorescent pattern 330, the infrared light IR1 is not canceled or extinguished while being transferred to the outside through the infrared control film 340. As a result, the infrared stylus 200 can effectively detect touch coordinates by detecting reflected infrared light of a specific pattern through the infrared fluorescent pattern 330 formed inside the display panel 110 and the infrared control film 340 positioned on the light emitting surface. In addition, the infrared fluorescent pattern 330 and the infrared control film 340 can be applied to the upper light emitting structure.

Figure 14:
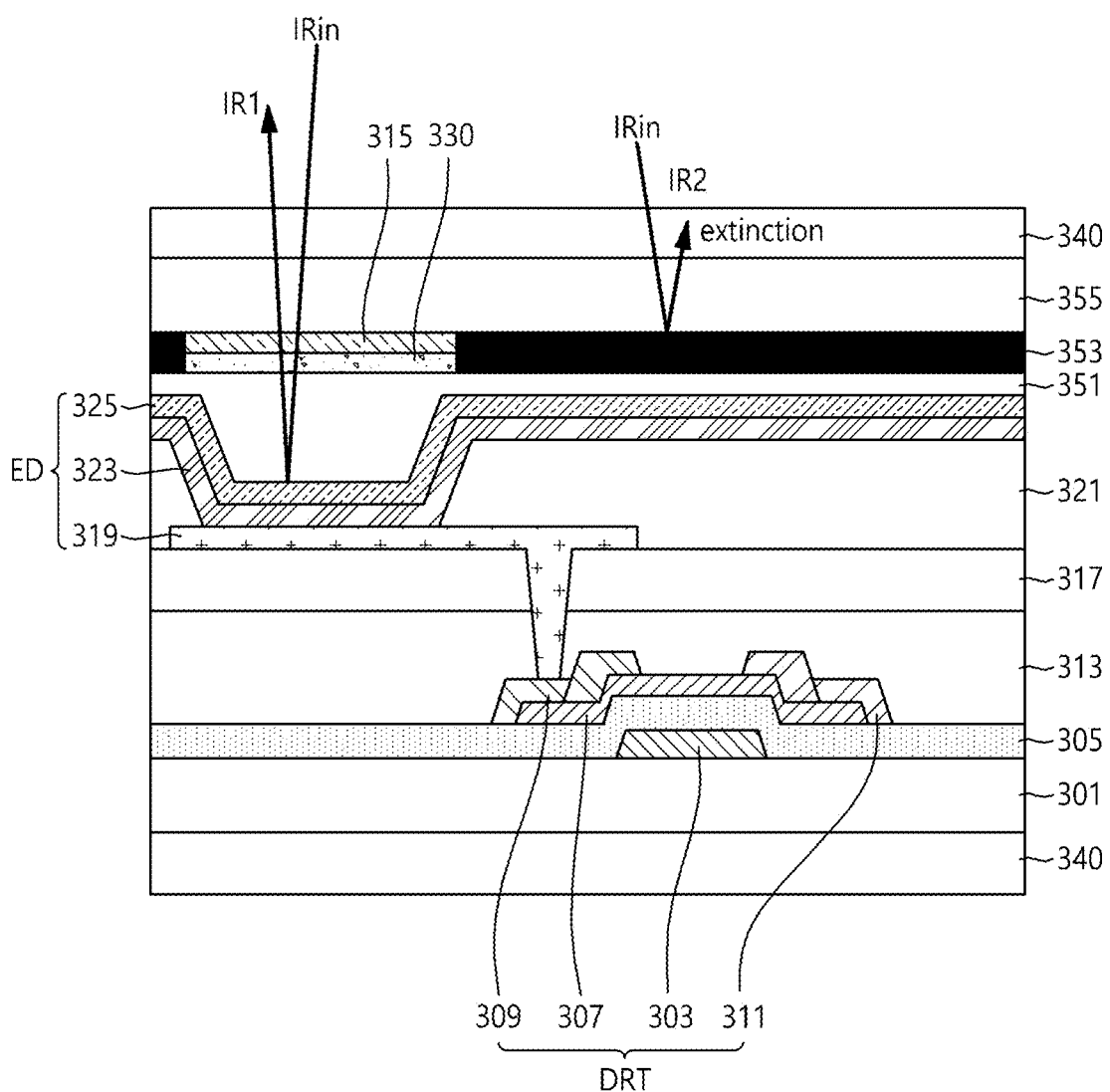
FIG. 14 is a cross-sectional view illustrating a top emission structure of a touch display device according to embodiments of the disclosure.

Next, FIG. 14 is a cross-sectional view schematically illustrating a top emission structure of a touch display device according to embodiments of the disclosure. Referring to FIG. 14, a touch display device 100 according to embodiments of the disclosure can include a substrate 301, a driving transistor DRT, a color filter 315, a light emitting element ED, an infrared fluorescent pattern 330, and an infrared control film 340.

Here, the driving transistor DRT is illustrated as an example, but the switching transistors SWT1 and SWT2 can have a structure similar to that of the driving transistor DRT depending on the position. The substrate 301 can also be formed of a transparent glass material or plastic.

In addition, the driving transistor DRT includes a gate electrode 303, an active layer 307, a drain electrode 309, and a source electrode 311, and is for driving the light emitting element ED. The driving transistor DRT can be a bottom gate structure in which the gate electrode 303, the gate insulation layer 305, the active layer 307, the drain electrode 309, and the source electrode 311 are sequentially stacked.

Further, the gate insulation layer 305 can be disposed on the substrate 301 to cover the gate electrode 303. Thus, the gate insulation layer 305 insulates the gate electrode 303 and the active layer 307 from each other. The gate insulation layer 305 can also be formed of an insulative inorganic material such as silicon oxide (SiOx) or silicon nitride (SiNx), or can be formed of an insulative organic material.

Further, the active layer 307 can be disposed on the gate insulation layer 305 and be formed of polycrystalline silicon. In this instance, a partial area can be doped with impurities. Further, the active layer 307 can be formed of amorphous silicon, an organic semiconductor material, or oxide.

In addition, the source electrode 311 and the drain electrode 309 can be disposed on the gate insulation layer 305 and the active layer 307. The source electrode 311 and the drain electrode 309 can also be formed of a metallic material.

A planarization layer 313 is also disposed on the driving transistor DRT. Thus, the planarization layer 313 is an insulation layer for protecting the driving transistor DRT and planarizing an upper portion of the driving transistor DRT. The planarization layer 313 can also include a contact hole for electrically connecting the driving transistor DRT and the anode electrode 319 of the light emitting element ED.

Specifically, the planarization layer 313 includes a contact hole exposing any one of the source electrode 311 or the drain electrode 309 of the driving transistor DRT. The planarization layer 313 can also be formed of an organic insulating material. The planarization layer 313 can also include a single layer or can be composed of double or multiple layers. An overcoat layer 317 can also be positioned on the planarization layer 131.

Further, the light emitting element ED is disposed on the overcoat layer 317. In more detail, the light emitting element ED is driven by the driving transistor DRT and includes an anode electrode 319 and a cathode electrode 325 facing each other, and a light emitting layer 323 interposed therebetween. The light emitting area of the light emitting element ED can be defined by a bank 321.

Further, the anode electrode 319 is electrically connected to the driving transistor DRT. Specifically, the anode electrode 319 can be connected to any one of the source electrode 309 or the drain electrode 311 of the driving transistor DRT through a contact hole formed in the overcoat layer 317 and the planarization layer 313. Here, the anode electrode 319 is electrically connected to the drain electrode 311 of the driving transistor DRT. In this instance, an image signal for displaying an image signal is applied to the anode electrode 319 through the drain electrode 311.

Since the anode electrode 319 supplies holes to the light emitting layer 323, the anode electrode 319 is formed of a conductive material having a high work function. For example, the anode electrode 319 can be formed of a transparent conductive oxide (TCO) such as indium tin oxide (ITO).

In addition, the anode electrodes 319 are disposed on the overcoat layer 317 to be spaced apart from each other for each subpixel. Also, the light emitting layer 323 is disposed on the anode electrode 319. In particular, the light emitting layer 323 can be formed of a phosphorescent or fluorescent material, and can further include a hole injection layer, a hole transport layer, an electron transport layer, an electron injection layer, or the like, if necessary. The light emitting layer 323 can also include a material capable of emitting light of a specific color.

Further, the cathode electrode 325 is disposed to face the anode electrode 319 with the light emitting layer 323 interposed therebetween. In particular, the cathode electrode 325 supplies electrons to the light emitting layer 323. For example, the cathode electrode 325 can be formed of a metallic material having a low work function, such as a metal alloy such as MgAg, a metal alloy including ytterbium (Yb), or the like. When the touch display device 100 is a top emission type organic light emitting display device, the cathode electrode 325 can be formed of a transparent conductive layer including a reflective layer having high reflectivity.

In addition, the bank 321 is disposed on the overcoat layer 317 for the remaining area except for the light emitting area. In other words, the bank 321 can be disposed to cover only a portion of the anode electrode 319 to expose a portion of the anode electrode 319, and an area corresponding to a portion of the anode electrode 319 exposed by the bank 321 can be defined as a light emitting area. The bank 321 can also be formed of an inorganic insulating material such as silicon oxide or silicon nitride, or an organic insulating material such as an acrylic resin or an imide resin.

An encapsulation layer 351 can also be disposed on the cathode electrode 325. In particular, the encapsulation layer 351 is configured to protect the light emitting element ED, which is vulnerable to moisture, from being exposed to moisture. For example, the encapsulation layer 351 can be formed of a structure in which an inorganic layer and an organic layer are alternately stacked, or a structure in which an inorganic layer/organic layer/inorganic layer is stacked, but is not limited thereto.

An infrared fluorescent pattern 330 can also be formed in a partial area of the position corresponding to the emission area, on the encapsulation layer 351. The infrared fluorescent pattern 330 is formed in an area forming an encryption pattern among color filters 315.

Further, the color filter 315 can be disposed at a position corresponding to the light emitting area on the encapsulation layer 351. In this instance, some color filters 315 can be positioned above the infrared fluorescent pattern 330. The color filter 315 can also be formed to emit red, green, blue, and white colors. The color filters 315 of each color can be sequentially arranged in a horizontal direction or a vertical direction, or can be alternately arranged. A black matrix 353 for preventing light from leaking can also be disposed in an area in which the color filter 315 is not disposed.

An upper substrate 355 can also be coupled to an upper portion of the color filter 315 and the black matrix 353. In the position where the infrared fluorescent pattern 330 is formed, infrared light reflected from the inner metal electrode (here, the cathode electrode 325) are diffusely reflected and transferred. Accordingly, the infrared light IR1 transferred to the light emitting surface through the infrared fluorescent pattern 330 is transferred to the outside without being canceled out by the infrared control film 340.

On the other hand, the position where the infrared fluorescent pattern 330 is not formed is linearly polarized by the infrared control film 340 during the incident process, and the infrared light IR2 reflected from the internal metal electrode (here, the cathode electrode 325) is canceled while passing through the infrared control film 340. Here, when the cathode electrode 325 is used as an infrared reflection electrode is exemplified, and an electrode other than the cathode electrode 325 can be used as an infrared reflection electrode. The infrared reflective electrode can also have a structure in which an oxide such as silicon oxide (SiO2) or titanium oxide (TiO2) is deposited as a multilayer thin film. An infrared control film 340 can be disposed on the surface of the upper substrate 355.

As described above, the touch display device 100 according to the disclosure can effectively detect touch coordinates of the infrared stylus 200 by detecting reflected infrared light through the infrared fluorescent pattern 330 formed to correspond to some color filters of the display panel 110 and the infrared control film 340 formed on the light emitting surface of the display panel 110.

In addition, in the touch display device 100 of the disclosure, the metal electrode used inside the display panel 110 can be a low-reflective metal having low reflectivity of infrared light. For example, the infrared reflection electrode that reflects infrared light incident therein can include an anode electrode, a cathode electrode, an electrode of a transistor, a metal wire, and the like, and these metal electrodes can be used as low reflection metals having an infrared reflectance of 10% or less.

Figure 15:
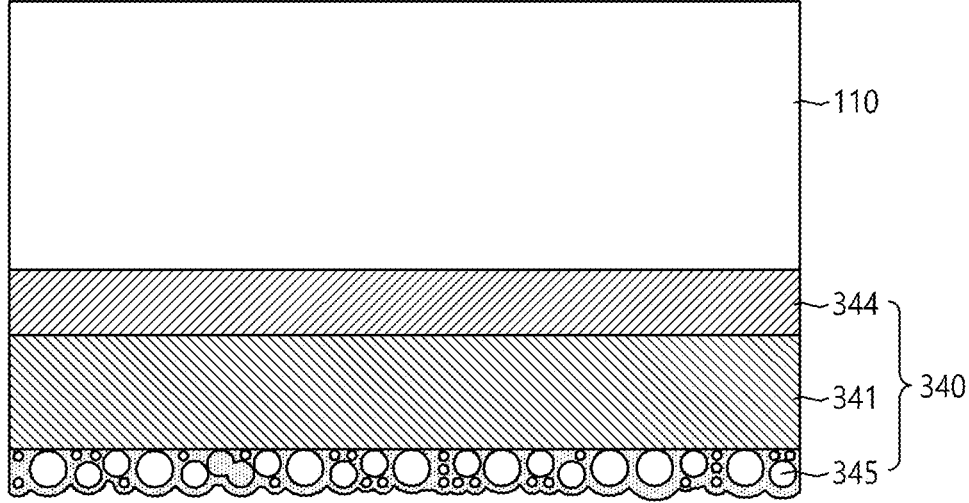
FIG. 15 is a view illustrating a structure of an infrared control film coupled to a display panel having a low-reflection metal structure in a touch display device according to embodiments of the disclosure.

Next, FIG. 15 is a view illustrating a structure of an infrared control film coupled to a display panel having a low-reflection metal structure in a touch display device according to embodiments of the disclosure. Referring to FIG. 15, when a low-reflective metal having low reflectivity of infrared light is used inside the display panel 110, the infrared control film 340 can be configured with a base film 341, an adhesive layer 344, and a surface treatment layer 345 without the polarizing layers 342 and 343.

In particular, the base film 341 can be formed of a tri-acetyl-cellulose (TAC) film or a polyester (PET) film. Also, the adhesive layer 344 can be in contact with the display panel 110 and have a higher infrared transmissivity than a visible light transmissivity. Further, the adhesive layer 344 can include a base resin, a crosslinking agent, a binder, and an additive. The base resin is also a polymer material formed of an acrylic monomer, and can be, e.g., alkyl acrylate having 4 to 17 carbon atoms. The base resin can also include the functional group monomer that regulates the polar group and reacts with the crosslinking agent.

In addition, the crosslinking agent can connect linear copolymer chains to form a three-dimensional network structure, and enhance the cohesion of the adhesive layer 344 to enhance heat resistance performance. Further, the binder forms a strong bonding force to a portion (e.g., a substrate) to which the adhesive layer 344 is bonded. In particular, the binder can enhance the bonding force with the adhesive layer 344, which is an organic material, when the bonded portion is an inorganic material.

Also, the additive prevents charging of the adhesive layer 344, and a dye or pigment for controlling transmissivity can be injected. The surface treatment layer 345 can also enhance the hardness of the infrared control film 340 and prevent infrared reflection of the surface. The surface treatment layer 345 can also include an anti-smudge coating that reduces visibility due to oil contamination by controlling fine dust on the surface and enhancing lipophilic properties. As such, the infrared control film 340 in which the polarizing layer is omitted can be applied not only to the bottom emission structure of FIG. 5 but also to the upper light emitting structure of FIG. 13.

Figure 16:
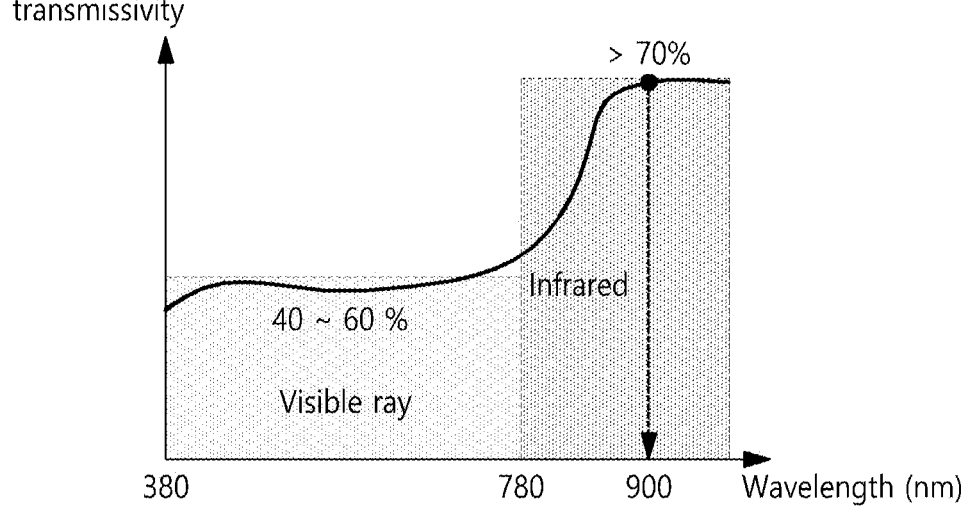
FIG. 16 is a view illustrating a transmissivity of an adhesive layer constituting an infrared control film in a touch display device according to embodiments of the disclosure.

Next, FIG. 16 is a view illustrating a transmissivity of an adhesive layer constituting an infrared control film in a touch display device according to embodiments of the disclosure. Referring to FIG. 16, the touch display device 100 can include an infrared control film 340 formed on a surface (e.g., a substrate) of the display panel 110.

In this instance, the infrared control film 340 can form a higher transmissivity of infrared light than the transmissivity of visible rays, thereby effectively detecting reflected infrared light transmitted through the infrared fluorescent pattern 330 and enhancing touch precision. For example, the infrared control film 340 can maintain the transmissivity of visible light at 40 to 60% to reduce visible light reflected from the inside of the display panel 110, and can maintain the transmissivity of infrared light at 70% or more. Also, the component of the dye or pigment injected into the additive constituting the infrared control film 340 can be adjusted.

As described above, when the infrared transmissivity of the infrared control film 340 is high, reflected infrared light transmitted through the infrared fluorescent pattern 330 formed on the display panel 110 can be clearly detected.

Embodiments of the disclosure described above are briefly described below. A touch display device can include a display panel including a plurality of light emitting elements, a plurality of transistors, a plurality of color filters formed at positions corresponding to the plurality of light emitting elements, and an infrared fluorescent pattern formed at a position overlapping at least some of the plurality of color filters, a driving circuit driving the display panel, and an infrared control film positioned on a light emitting surface of the display panel.

In addition, the infrared fluorescent pattern can include a cell area where an encryption pattern is positioned and a guide line for dividing the cell area. The cell area can be formed with a different cell pattern for each area into which the cell area is divided by the guide line. The guide line can also be an area where the infrared fluorescent pattern is disposed at a predetermined interval.

Further, the infrared fluorescent pattern can be formed to have the same width as a color filter at a position corresponding thereto. The infrared fluorescent pattern can also be formed above or under a color filter at a position corresponding thereto. The infrared fluorescent pattern can include a phosphor body and a plurality of infrared fluorescent pigments injected into the phosphor body. The phosphor body can also be formed of photoresist.

In addition, the infrared control film can include a base film, a first conversion layer formed on the base film to convert infrared light into linearly polarized light, a second conversion layer delaying infrared light converted into the linearly polarized light by ¼ wavelength through the first conversion layer, and an adhesive layer coupling the second conversion layer to the display panel. The infrared control film can also include an adhesive layer for coupling to the display panel, a surface treatment layer enhancing hardness, and a base film positioned between the surface treatment layer and the adhesive layer.

Further, the adhesive layer can have a visible light transmissivity of 40% to 60%. The adhesive layer can also have an infrared transmissivity of 70% or more. In addition, the light emitting elements or the transistors can include an infrared reflective electrode reflecting infrared light. The infrared reflective electrode can be an anode electrode or a cathode electrode of the light emitting element.

Further, the infrared reflective electrode can be at least one of a gate electrode, a drain electrode, and a source electrode of the transistor. The infrared reflective electrode can also have a structure in which silicon oxide or titanium oxide is deposited as a multilayer thin film.

A display panel according to embodiments of the disclosure can include a plurality of light emitting elements having an anode electrode or a cathode electrode used as an infrared reflective electrode, a plurality of transistors having a gate electrode, a drain electrode, and a source electrode, at least one of which is used as an infrared reflective electrode, a plurality of color filters formed at positions corresponding to the plurality of light emitting elements, an infrared fluorescent pattern formed at a position overlapping at least some of the plurality of color filters, and an infrared control film positioned on a light emitting surface.

Also, a touch display device according to embodiments of the disclosure can include a display panel including a plurality of light emitting elements, a plurality of transistors, and a plurality of color filters formed at positions corresponding to the plurality of light emitting elements and an infrared control film positioned on a light emitting surface of the display panel. Some of the plurality of color filters can include an infrared fluorescent pigment.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure.

What is claimed:

1. A touch display device, comprising:
  a display panel including a plurality of light emitting elements; a plurality of color filters formed at positions corresponding to the plurality of light emitting elements; and an infrared fluorescent pattern comprising a plurality of individual infrared fluorescent cell patterns formed at a position overlapping at least some of the plurality of color filters; and
  an infrared control film positioned on a light emitting surface of the display panel,
  wherein the infrared control film includes:

a base film;
  a first conversion layer formed on the base film to convert infrared light into linearly polarized light;
  a second conversion layer delaying infrared light converted into the linearly polarized light by a ¼ wavelength through the first conversion layer; and
  an adhesive layer coupling the second conversion layer to the display panel.

2. The touch display device of claim 1, wherein the infrared fluorescent pattern includes:
  guide lines dividing the infrared fluorescent pattern into a plurality of cell areas in which each cell area includes a specific encryption pattern defined by a specific arrangement of the individual infrared fluorescent patterns.

3. The touch display device of claim 2, wherein the plurality of cell areas include:
  a first cell area having a first specific encryption pattern defined by a first arrangement of the individual infrared fluorescent patterns; and
  a second cell area having a second specific encryption pattern defined by a second arrangement of the individual infrared fluorescent patterns.

4. The touch display device of claim 2, wherein the guide lines are disposed at predetermined intervals.

5. The touch display device of claim 2, wherein the guide line includes a plurality of first guide lines respectively extending in a first direction and a plurality of second guide lines respectively extending in a second direction perpendicular to the first direction.

6. The touch display device of claim 1, wherein a respective individual infrared fluorescent pattern is formed to have a same width as a corresponding color filter at a position corresponding thereto.

7. The touch display device of claim 1, wherein a respective individual infrared fluorescent pattern is formed over or under a color filter at a position corresponding thereto.

8. The touch display device of claim 1, wherein a respective individual infrared fluorescent pattern includes:
  a phosphor body; and
  an infrared fluorescent pigment injected into the phosphor body.

9. The touch display device of claim 8, wherein the phosphor body is formed of photoresist.

10. The touch display device of claim 1, further comprising:
  a surface treatment layer enhancing a hardness on either side of the base film.

11. The touch display device of claim 10, wherein the adhesive layer has a visible light transmissivity of 40% to 60%.

12. The touch display device of claim 10, wherein the adhesive layer has an infrared transmissivity of 70% or more.

13. The touch display device of claim 1, wherein the plurality of light emitting elements include an infrared reflective electrode reflecting infrared light.

14. The touch display device of claim 13, wherein the infrared reflective electrode is an anode electrode or a cathode electrode of the light emitting element.

15. The touch display device of claim 13, wherein the display panel further comprises:
  a plurality of transistors for controlling the light emitting elements, wherein at least one of a gate electrode, a drain electrode, and a source electrode of a corresponding transistor comprises an infrared reflective electrode reflecting infrared light.

16. The touch display device of claim 13, wherein the infrared reflective electrode includes silicon oxide or titanium oxide deposited as a multilayer thin film.

17. A display panel, comprising:

a plurality of light emitting elements having an anode infrared reflective electrode or a cathode infrared reflective electrode;

a plurality of transistors having a gate electrode, a drain electrode, and a source electrode, at least one of which is used as an infrared reflective electrode;

a plurality of color filters formed at positions corresponding to the plurality of light emitting elements;

an infrared fluorescent pattern comprising a plurality of individual infrared fluorescent cell patterns formed at a position overlapping at least some of the plurality of color filters; and an infrared control film positioned on a light emitting surface, wherein the infrared control film includes:

a base film;

a first conversion layer formed on the base film to convert infrared light into linearly polarized light;

a second conversion layer delaying infrared light converted into the linearly polarized light by a ¼ wavelength through the first conversion layer, and an adhesive layer coupling the second conversion layer to the display panel.

* * * * *